(12) United States Patent
Shoda et al.

(10) Patent No.: US 11,340,627 B2
(45) Date of Patent: May 24, 2022

(54) VEHICLE CONTROL SYSTEM, VEHICLE CONTROL METHOD, AND STORAGE MEDIUM

(71) Applicant: HONDA MOTOR CO., LTD., Tokyo (JP)

(72) Inventors: Yasushi Shoda, Wako (JP); Junpei Noguchi, Wako (JP); Yuki Hara, Wako (JP); Ryoma Taguchi, Tokyo (JP); Yuta Takada, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 348 days.

(21) Appl. No.: 16/716,576

(22) Filed: Dec. 17, 2019

(65) Prior Publication Data

US 2020/0209878 A1 Jul. 2, 2020

(30) Foreign Application Priority Data

Dec. 26, 2018 (JP) .............................. JP2018-242824

(51) Int. Cl.
*G05D 1/02* (2020.01)
*B60W 10/04* (2006.01)
(Continued)

(52) U.S. Cl.
CPC ........... *G05D 1/0231* (2013.01); *B60W 10/04* (2013.01); *B60W 10/18* (2013.01); *B60W 10/20* (2013.01);
(Continued)

(58) Field of Classification Search
CPC ........... B60W 30/06; B60W 60/00272; B60W 40/08; B60W 30/14; B60W 10/00;
(Continued)

(56) References Cited

U.S. PATENT DOCUMENTS

2017/0153714 A1* 6/2017 Gao .................... G06K 9/00798
2021/0309212 A1* 10/2021 Sonalker ............ G01C 21/3685

FOREIGN PATENT DOCUMENTS

| JP | 2000-087582 | 3/2000 |
| JP | 2012-123491 | 6/2012 |

(Continued)

OTHER PUBLICATIONS

KR-20200055146 English translation (IP.com) (Year: 2022).*
Japanese Office Action for Japanese Patent Application No. 2018-242824 dated Nov. 2, 2021.

*Primary Examiner* — Jelani A Smith
*Assistant Examiner* — Paul Castro
(74) *Attorney, Agent, or Firm* — Amin, Turocy & Watson, LLP

(57) ABSTRACT

A vehicle control system includes a first recognizer configured to recognize a surrounding situation of a vehicle, a driving controller configured to control steering, acceleration, and deceleration on the basis of the surrounding situation, a second recognizer configured to recognize a physical object placed in an interior, and an acquirer configured to acquire a movement instruction for moving the vehicle to a parking area according to control of the driving controller, the movement instruction being output on the basis of an action of a user who has not got into the vehicle, wherein the driving controller causes the vehicle to move to an accessible area capable of being accessed by the user or causes the vehicle to stay in the accessible area when the acquirer has acquired the movement instruction and the second recognizer has recognized the physical object placed in the interior of the vehicle.

16 Claims, 18 Drawing Sheets

(51) Int. Cl.
  *B60W 10/18* (2012.01)
  *B60W 10/20* (2006.01)
  *G06V 20/56* (2022.01)
  *G06V 20/59* (2022.01)
  *H04N 5/225* (2006.01)
  *B60W 30/06* (2006.01)

(52) U.S. Cl.
  CPC .............. *G06V 20/56* (2022.01); *G06V 20/59* (2022.01); *B60W 30/06* (2013.01); *B60W 2420/42* (2013.01); *G05D 2201/0213* (2013.01); *H04N 5/2253* (2013.01)

(58) Field of Classification Search
  CPC ...... B60W 50/00; B60W 50/14; B60W 50/08; B60W 30/08; B60W 30/00; B60W 50/082; B60W 30/18009; B60W 50/0097; B60W 30/18163; B60W 60/001; B60W 2554/00; B60W 2556/50; B60W 60/0025; B60W 40/10; B60W 60/00253; B60W 2540/041; B60W 60/0024; B60W 60/0053; B60W 2756/10; B60W 60/0051; B60W 2555/00; B60W 2540/043; B60W 30/17; B60W 2050/0067; B60W 60/005; B60W 2540/215; G01C 21/3423; G01C 21/3697; G05D 1/0251; G05D 1/0212; G05D 1/0061; G05D 1/0214; G05D 1/021; G08B 21/24; G08G 1/146; G08G 1/00; G08G 1/202; G08G 1/142; B62D 15/0285; B62D 15/027; B60N 2/002; B60R 1/00; B60R 16/02; B60R 16/0232; B60K 35/00; G06K 9/00771; G06K 9/00832

See application file for complete search history.

(56) References Cited

FOREIGN PATENT DOCUMENTS

| | | | |
|---|---|---|---|
| JP | 2017-182301 | 10/2017 | |
| JP | 2018-097536 | 6/2018 | |
| JP | 2018-180946 | 11/2018 | |
| JP | 2019-168815 | 10/2019 | |
| KR | 20200055146 A | * 5/2020 | ............ H04W 4/029 |

* cited by examiner

180

| OBSERVED PHYSICAL OBJECT ID | IMAGE | DISTRIBUTION OF FEATURE QUANTITIES |
|---|---|---|
| OB001 | IM001 | FV001 |
| OB002 | IM002 | FV002 |
| OB003 | IM003 | FV003 |
| ⋮ | ⋮ | ⋮ |

182

| TIME | FACILITY | DETAILS |
|---|---|---|
| 2018/12/10 09:00~10:00 | A | CONFERENCE |
| 2018/12/10 14:00~16:00 | B | BUSINESS |
| 2018/12/10 18:00 | C | RETURN HOME |
| ⋮ | ⋮ | ⋮ |

VEHICLE CONTROL SYSTEM, VEHICLE CONTROL METHOD, AND STORAGE MEDIUM

CROSS-REFERENCE TO RELATED APPLICATION

Priority is claimed on Japanese Patent Application No. 2018-242824, filed Dec. 26, 2018, the content of which is incorporated herein by reference.

BACKGROUND

Field

The present invention relates to a vehicle control system, a vehicle control method, and a storage medium.

Description of Related Art

In recent years, research on automatically controlling vehicles has been conducted. In automated valet parking using this technology, a parking management device which creates a leaving travel route from a parking position of a vehicle which has been requested to leave the parking position to a getting-into area when a leaving request signal for requesting leaving after parking is received and transmits information of the leaving travel route to the vehicle has been disclosed (Japanese Unexamined Patent Application, First Publication No. 2018-97536).

For example, when automated valet parking is performed, a user may be inconvenienced due to the movement of the vehicle to a parking area after the user of the vehicle gets out of the vehicle. For example, when the user desires to take out luggage placed in the vehicle, he/she may need the vehicle to be taken out of the parking area.

However, solving the above-mentioned inconvenience is not taken into account in the above-described technology.

The present invention has been made in consideration of such circumstances, and an objective of the present invention is to provide a vehicle control system, a vehicle control method, and a storage medium that can improve convenience for a user.

SUMMARY

A vehicle control system, a vehicle control method, and a storage medium according to the present invention adopt the following configurations.

(1) According to an aspect of the present invention, a vehicle control system is provided, including: a first recognizer configured to recognize a surrounding situation of a vehicle; a driving controller configured to control steering, acceleration, and deceleration of the vehicle without depending upon an operation of an occupant on the basis of the surrounding situation recognized by the first recognizer; a second recognizer configured to recognize a physical object placed in an interior of the vehicle; and an acquirer configured to acquire a movement instruction for moving the vehicle to a parking area according to control of the driving controller, the movement instruction being output on the basis of an action of a user who has not got into the vehicle, wherein the driving controller causes the vehicle to move to an accessible area capable of being accessed by the user or causes the vehicle to stay in the accessible area when the acquirer has acquired the movement instruction and the second recognizer has recognized the physical object placed in the interior of the vehicle.

(2) In the above-described aspect (1), the accessible area is an area different from the parking area.

(3) In the above-described aspect (1) or (2), the accessible area is a getting-out area where the user in the vehicle gets out of the vehicle when the vehicle moves to the parking area according to control of the driving controller or a getting-into area where the user gets into the vehicle when the vehicle parked in the parking area has left according to control of the driving controller.

(4) In any one of the above-described aspects (1) to (3), the user who has not got into the vehicle is the user in the vehicle immediately before the acquirer acquires the movement instruction.

(5) In any one of the above-described aspects (1) to (4), the second recognizer determines whether or not the physical object is placed in the interior of the vehicle when the user in the vehicle has got out of the vehicle.

(6) In any one of the above-described aspects (1) to (5), the driving controller causes the vehicle to move to the parking area without causing the vehicle to move to the accessible area when the acquirer has acquired the movement instruction and the second recognizer has not recognized the physical object placed in the interior of the vehicle.

(7) In any one of the above-described aspects (1) to (6), the vehicle control system further includes a position information acquirer configured to acquire position information of the user, wherein the driving controller changes a route for moving the vehicle to the accessible area according to control of the driving controller or a speed while moving on the basis of the position information of the user and position information related to the vehicle.

(8) In the above-described aspect (7), the driving controller causes the vehicle to move to the accessible area near a position of the user among a plurality of accessible areas on the basis of the position information of the user and the position information related to the vehicle.

(9) In any one of the above-described aspects (1) to (8), the vehicle control system further includes a provider configured to provide a terminal device of the user with information indicating that the physical object is left behind in the interior of the vehicle when the acquirer has acquired the movement instruction and the second recognizer has recognized the physical object placed in the interior of the vehicle.

(10) In any one of the above-described aspects (1) to (9), the second recognizer recognizes the physical object on the basis of an image captured by an imager which images a state of the interior of the vehicle.

(11) In any one of the above-described aspects (1) to (10), the physical object is a physical object previously registered in association with information based on a captured image, and the vehicle control system further includes an information provider configured to notify a terminal device of the user of information indicating that the physical object is left behind in the interior of the vehicle when the second recognizer has recognized the previously registered physical object on the basis of the image.

(12) In any one of the above-described aspects (1) to (11), the physical object is a physical object different from a physical object previously registered in association with information based on a captured image, and the vehicle control system further includes an information provider configured to notify a terminal device of the user of information indicating that the physical object is left behind in the interior of the vehicle when the second recognizer has recognized the physical object that has not been previously registered on the basis of the image.

(13) In any one of the above-described aspects (1) to (12), the vehicle control system further includes a congestion information acquirer configured to acquire a degree of congestion of the accessible area capable of being accessed by the user, wherein the driving controller does not cause the vehicle to move to the accessible area having the degree of congestion acquired by the congestion information acquirer greater than or equal to a prescribed degree when the acquirer has acquired the movement instruction and the second recognizer has recognized the physical object placed in the interior of the vehicle.

(14) In any one of the above-described aspects (1) to (13), the driving controller causes the vehicle to move to the parking area when a prescribed period of time has elapsed from the time of movement of the vehicle to the accessible area according to control of the driving controller.

(15) In any one of the above-described aspects (1) to (14), the vehicle control system further includes an acquirer configured to acquire the next scheduled clock time at which the user for which the movement instruction has been output will get into the vehicle, wherein the driving controller does not cause the vehicle to move to the accessible area capable of being accessed by the user when the acquirer has acquired the movement instruction, the second recognizer has recognized the physical object placed in the interior of the vehicle, and the scheduled clock time at which the user will get into the vehicle acquired by the acquirer is within a prescribed period of time from a current clock time.

(16) According to an aspect of the present invention, a vehicle control method is provided, including: recognizing, by a computer, a surrounding situation of a vehicle; controlling, by the computer, steering, acceleration, and deceleration of the vehicle without depending upon an operation of an occupant on the basis of the recognized surrounding situation; recognizing, by the computer, a physical object placed in an interior of the vehicle; acquiring, by the computer, a movement instruction for moving the vehicle to a parking area according to control of the steering, the acceleration, and the deceleration of the vehicle, the movement instruction being output on the basis of an action of a user who has not got into the vehicle; and causing, by the computer, the vehicle to move to an accessible area capable of being accessed by the user or causing the vehicle to stay in the accessible area when the movement instruction has been acquired and the physical object placed in the interior of the vehicle has been recognized.

(17) According to an aspect of the present invention, a non-transitory computer-readable storage medium that stores a computer program to be executed by a computer to perform at least: recognize a surrounding situation of a vehicle; control steering, acceleration, and deceleration of the vehicle without depending upon an operation of an occupant on the basis of the recognized surrounding situation; recognize a physical object placed in an interior of the vehicle; acquire a movement instruction for moving the vehicle to a parking area according to control of the steering, the acceleration, and the deceleration of the vehicle, the movement instruction being output on the basis of an action of a user who has not got into the vehicle; and move the vehicle to an accessible area capable of being accessed by the user or make the vehicle stay in the accessible area when the movement instruction has been acquired and the physical object placed in the interior of the vehicle has been recognized.

According to (1) to (6), (10), (16), and (17), the convenience for the user can be improved.

According to (7), the behavior of the vehicle is further changed in accordance with the surrounding situation. As a result, for example, the vehicle behaves so that surrounding congestion is taken into account.

According to (8), because the vehicle arrives at a position convenient for the user, the convenience for the user is further improved.

According to (9), the user can easily recognize that a physical object is left behind in the interior of the vehicle.

According to (11) and (12), the physical object which has been left behind by the user can be recognized more reliably. Also, an unnecessary notification regarding a physical object that is not left behind can be minimized.

According to (13) and (14), congestion can be further minimized.

According to (15), the unnecessary behavior of the vehicle is further minimized.

DETAILED DESCRIPTION

Hereinafter, embodiments of a vehicle control system, a vehicle control method, and a storage medium according to the present invention will be described with reference to the drawings.

Figure 1:
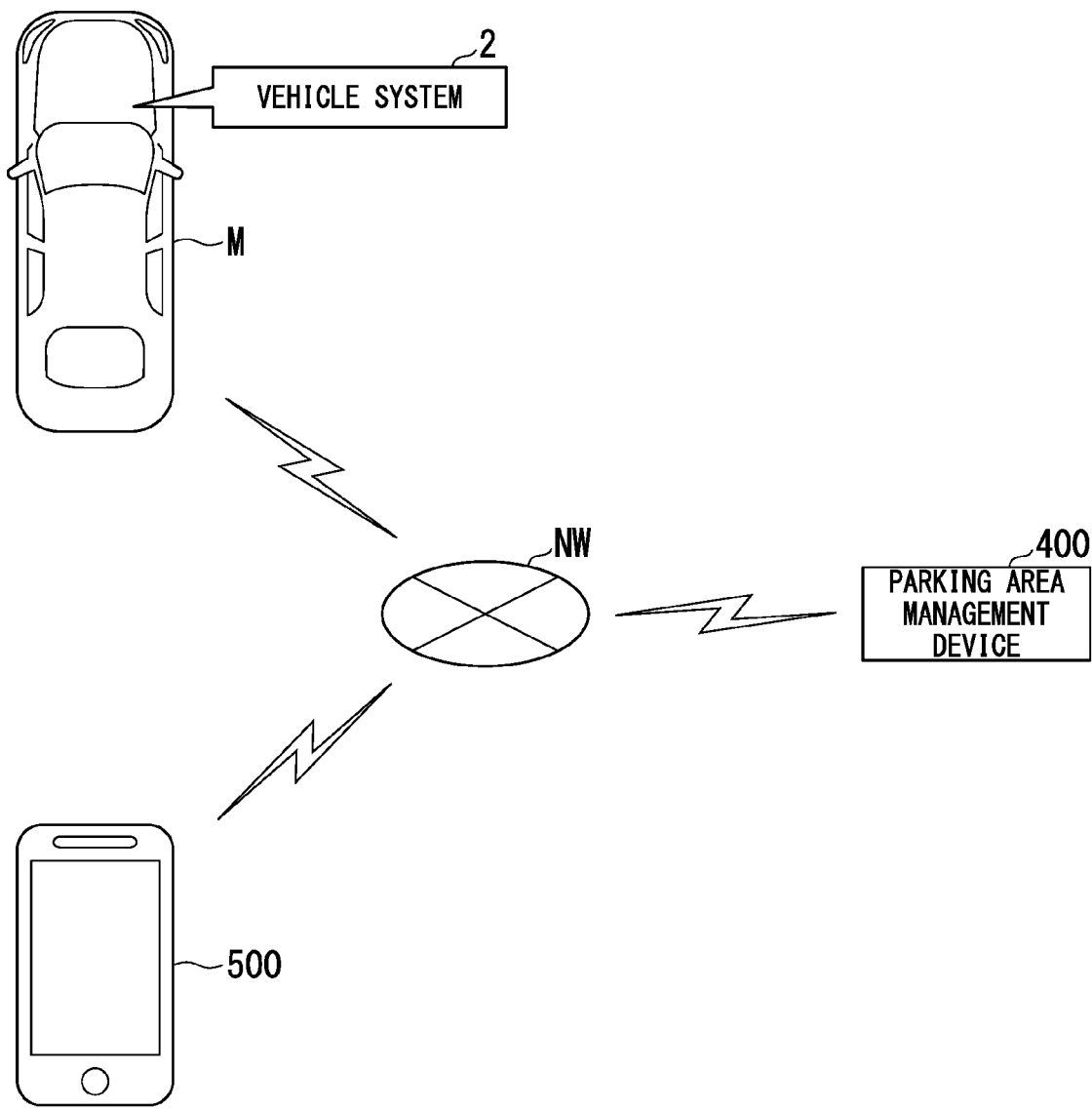
FIG. 1 is a configuration diagram of a parking area management system including a vehicle system using a vehicle control system.

FIG. 1 is a configuration diagram of a parking area management system 1 including a vehicle system 2 using the vehicle control system. The parking area management system 1 includes, for example, one or more vehicles (hereinafter, host vehicles M) on which the vehicle system 2 is mounted, one or more parking area management devices 400, and one or more terminal devices 500. These components can communicate with each other via a network NW. The network NW includes a cellular network, a Wi-Fi network, the Internet, a wide area network (WAN), a local area network (LAN), a public circuit, a provider device, a dedicated circuit, a wireless base station, and the like. These components may directly perform wireless communication without involving the network NW. Details of the host vehicle M and the parking area management device 400 will be described below.

The terminal device 500 is, for example, a terminal device capable of being carried by a user. The terminal device 500 is, for example, a smartphone, a tablet terminal, a personal computer, or the like. The terminal device 500 communicates with the host vehicle M and transmits a user request to the host vehicle M or provides a push notification (a notification to the user) based on information received from the host vehicle M or the parking area management device 400. The terminal device 500 acquires position information identified by a position identifier of its own device and transmits the position information and a user ID of its own device to the host vehicle M or the parking area management device 400 at prescribed intervals.

[Overall Configuration]

Figure 2:
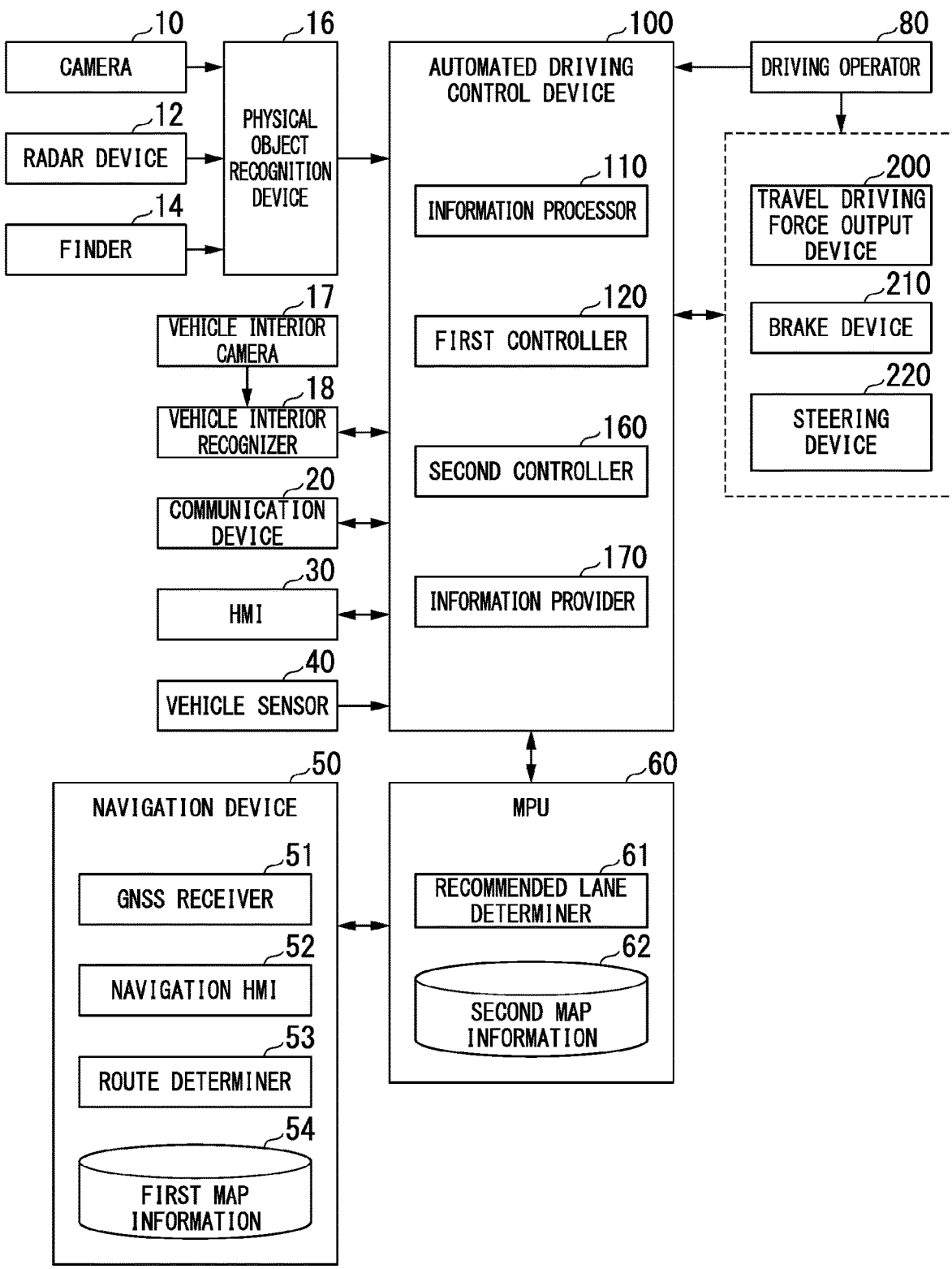
FIG. 2 is a configuration diagram of a vehicle system 2 using a vehicle control device according to an embodiment.

FIG. 2 is a configuration diagram of a vehicle system 2 using a vehicle control device according to an embodiment. For example, a vehicle on which the vehicle system 2 is mounted is, for example, a two-wheeled vehicle, a three-wheeled vehicle, or a four-wheeled vehicle. A driving source of the vehicle is an internal combustion engine such as a diesel engine or a gasoline engine, an electric motor, or a combination thereof. The electric motor is operated using electric power from an electric power generator connected to the internal combustion engine or discharge electric power of a secondary battery or a fuel cell.

For example, the vehicle system 2 includes a camera 10, a radar device 12, a finder 14, a physical object recognition device 16, a vehicle interior camera 17, a vehicle interior recognizer 18, a communication device 20, a human machine interface (HMI) 30, a vehicle sensor 40, a navigation device 50, a map positioning unit (MPU) 60, a driving operator 80, an automated driving control device 100, a travel driving force output device 200, a brake device 210, and a steering device 220. Such devices and equipment are connected to each other by a multiplex communication line such as a controller area network (CAN) communication line, a serial communication line, or a wireless communication network. The configuration shown in FIG. 2 is merely an example, a part of the configuration may be omitted, and another configuration may be further added.

For example, the camera 10 is a digital camera using a solid-state imaging element such as a charge-coupled device (CCD) or a complementary metal oxide semiconductor (CMOS). The camera 10 is attached to any position on the vehicle (hereinafter, a host vehicle M) on which the vehicle system 2 is mounted. When the view in front of the host vehicle M is imaged, the camera 10 is attached to an upper part of a front windshield, a rear surface of a rearview mirror, or the like. For example, the camera 10 periodically and iteratively images the surroundings of the host vehicle M. The camera 10 may be a stereo camera.

The radar device 12 radiates radio waves such as millimeter waves around the host vehicle M and detects at least a position (a distance to and a direction) of a physical object by detecting radio waves (reflected waves) reflected by the physical object. The radar device 12 is attached to any position on the host vehicle M. The radar device 12 may detect a position and speed of the physical object in a frequency-modulated continuous wave (FM-CW) scheme.

The finder 14 is a light detection and ranging (LIDAR) finder. The finder 14 radiates light to the vicinity of the host vehicle M and measures scattered light. The finder 14 detects a distance to an object on the basis of time from light emission to light reception. The radiated light is, for example, pulsed laser light. The finder 14 is attached to any position on the host vehicle M.

The physical object recognition device 16 performs a sensor fusion process on detection results from some or all of the camera 10, the radar device 12, and the finder 14 to recognize a position, a type, a speed, and the like of a physical object. The physical object recognition device 16 outputs recognition results to the automated driving control device 100. The physical object recognition device 16 may output detection results of the camera 10, the radar device 12, and the finder 14 to the automated driving control device 100 as they are. The physical object recognition device 16 may be omitted from the vehicle system 2.

The vehicle interior camera 17 is, for example, a digital camera using a solid-state imaging device such as a CCD or a CMOS. The vehicle interior camera 17 is a camera for imaging a physical object placed in the interior of the vehicle (an object left behind therein). For example, the vehicle interior camera 17 is attached to any position where a state of the interior of the host vehicle M can be imaged. For example, the vehicle interior camera 17 images the state of the interior of the host vehicle iteratively at a predetermined timing or periodically. The vehicle interior camera 17 may be a stereo camera.

For example, the vehicle interior recognizer 18 recognizes a physical object on the basis of an image captured by the vehicle interior camera 17. For example, the vehicle interior recognizer 18 recognizes a desired physical object (for example, a physical object placed by the user in the interior of the vehicle such as a bag or a wallet) using a function based on pattern matching or artificial intelligence (AI), a function based on a model given in advance, or the like. The model given in advance is a model in which learning for recognizing a physical object according to deep learning or the like is performed. The vehicle interior recognizer 18 is an example of a "second recognizer".

The vehicle interior recognizer 18 may recognize a physical object (for example, an occupant) in the interior of the vehicle on the basis of the following technique. The vehicle system 2 includes, for example, a sitting sensor that detects a load applied to the seat, a seat belt sensor that detects a wearing state of a seat belt, and a sound detector that detects a sound in the interior of the vehicle. The seat belt sensor is a sensor that detects a connected state between a male buckle and a female buckle of the seat belt. The sound detector analyzes a sound acquired by a microphone to which the sound in the interior of the vehicle is input and detects the occupant's voice (sound) on the basis of an analysis result.

(a) The vehicle interior recognizer 18 may recognize that there is a physical object in the interior of the vehicle when the sitting sensor detects that a load is placed on the seat. (b) When the seat belt sensor has detected that the male buckle and the female buckle are in the connected state, the vehicle interior recognizer 18 may recognize that there is an occupant in the interior of the vehicle because the seat belt is attached. (c) The vehicle interior recognizer 18 may recognize that there is an occupant in the interior of the vehicle when the sound detector has detected the occupant's voice (sound).

The vehicle interior recognizer 18 may recognize that there is a physical object (for example, an occupant) in the interior of the vehicle using one or more of the above-described detection techniques (a) to (c) or a combination of one or more of the above-described detection techniques (a) to (c) and a detection technique for detecting the physical object on the basis of an image captured by the vehicle interior camera 17 described above. For example, when the sitting sensor has detected a load applied to the seat and the seat belt sensor has detected that the male buckle and the female buckle of the seat belt are connected, the vehicle interior recognizer 18 recognizes that there is an occupant in the interior of the vehicle. For example, the vehicle interior recognizer 18 recognizes that there is an occupant (a child) in the interior of the vehicle when a child seat has been recognized on the basis of an image captured by the vehicle interior camera 17 and when the sound detector has detected a sound uttered by the occupant (a sound of the child) and the child present in the child seat has been recognized in image processing.

For example, the vehicle interior recognizer 18 may recognize that a physical object is placed in the interior of the vehicle on the basis of, for example, a communication result between the communication device and a communicator included in the physical object placed in the interior of the vehicle. For example, the vehicle system 2 is provided with a communication device in the interior of the vehicle. The communication device wirelessly communicates with a communicator included in the physical object using a prescribed communication standard such as Bluetooth (registered trademark). The above-described communicator is a communication unit mounted on a portable terminal device such as a smartphone or an anti-loss communication tag provided in a wallet, valuables, or the like. The vehicle interior recognizer 18 determines whether or not there is a physical object including the communicator in the interior of the vehicle on the basis of a communication result between the communication device in the interior of the vehicle and the above-described communicator.

For example, the vehicle interior recognizer 18 determines that there is no physical object in the interior of the vehicle because a physical object is taken out by the occupant when an intensity of radio waves transmitted by the communicator included in the physical object is gradually decreased from a reference value and is less than a threshold value after it is determined that the occupant has got out of the vehicle. For example, the vehicle interior recognizer 18 determines that there is a physical object in the interior of the vehicle because the physical object is not taken out by the occupant when the intensity of radio waves transmitted by the communicator included in the physical object is maintained with the reference value during a prescribed period of time after it is determined that the occupant has got out of the vehicle. In this manner, the vehicle interior recognizer 18 can detect a physical object present outside an angle of view of the vehicle interior camera 17 or a physical object that cannot be detected from an image captured by the vehicle interior camera 17 due to the dark interior of the vehicle by determining whether or not there is a physical object in the interior of the vehicle on the basis of a result of communication between the communication device and the communicator included in the physical object.

As described above, the vehicle interior recognizer 18 can recognize a physical object in the interior of the vehicle with higher accuracy by appropriately combining the detection techniques described above.

The communication device 20 communicates with the terminal device 500, another vehicle or the parking area management device 400 present in the vicinity of the host vehicle M, or various types of server devices using, for example, a network NW such as a cellular network or a Wi-Fi network, Bluetooth (registered trademark), dedicated short-range communication (DSRC), or the like.

The HMI 30 presents various types of information to an occupant of the host vehicle M and receives an input operation of the occupant. The HMI 30 includes various types of display devices, a speaker, a buzzer, a touch panel, a switch, keys, and the like.

The vehicle sensor 40 includes a vehicle speed sensor configured to detect the speed of the host vehicle M, an acceleration sensor configured to detect acceleration, a yaw rate sensor configured to detect an angular speed around a vertical axis, a direction sensor configured to detect a direction of the host vehicle M, and the like. The vehicle sensor 40 may include a sensor configured to detect the opening or closing of a door or a state of a door lock.

For example, the navigation device 50 includes a global navigation satellite system (GNSS) receiver 51, a navigation HMI 52, and a route determiner 53. The navigation device 50 stores first map information 54 in a storage device such as a hard disk drive (HDD) or a flash memory. The GNSS receiver 51 identifies a position of the host vehicle M on the basis of a signal received from a GNSS satellite. The position of the host vehicle M may be identified or corrected by an inertial navigation system (INS) using an output of the vehicle sensor 40. The navigation HMI 52 includes a display device, a speaker, a touch panel, keys, and the like. The navigation HMI 52 may be partly or wholly shared with the above-described HMI 30. For example, the route determiner 53 determines a route (hereinafter referred to as a route on a map) from the position of the host vehicle M identified by the GNSS receiver 51 (or any input position) to a destination input by the occupant using the navigation HMI 52 with reference to the first map information 54. The first map information 54 is, for example, information in which a road shape is expressed by a link indicating a road and nodes connected by a link. The first map information 54 may include a curvature of a road, point of interest (POI) information, and the like. The route on the map is output to the MPU 60. The navigation device 50 may perform route guidance using the navigation HMI 52 on the basis of the route on the map. The navigation device 50 may be implemented, for example, according to a function of a terminal device 500 such as a smartphone or a tablet terminal possessed by an occupant. The navigation device 50 may transmit a current position and a destination to a navigation server via the communication device 20 and acquire a route equivalent to the route on the map from the navigation server.

For example, the MPU 60 includes a recommended lane determiner 61 and stores second map information 62 in a storage device such as an HDD or a flash memory. The recommended lane determiner 61 divides the route on the map provided from the navigation device 50 into a plurality of blocks (for example, divides the route every 100 [m] with respect to a traveling direction of the vehicle), and determines a recommended lane for each block with reference to the second map information 62. The recommended lane determiner 61 determines what number lane the vehicle travels on from the left. The recommended lane determiner 61 determines the recommended lane so that the host vehicle M can travel along a reasonable traveling route for traveling to a branching destination when there is a branching point in the route on the map.

The second map information 62 is map information which has higher accuracy than the first map information 54. For example, the second map information 62 includes information about a center of a lane, information about a boundary of a lane, or the like. The second map information 62 may include road information, traffic regulations information, address information (an address/zip code), facility information, telephone number information, and the like. The second map information 62 may be updated at any time when the communication device 20 communicates with another device.

For example, the driving operator 80 includes an accelerator pedal, a brake pedal, a shift lever, a steering wheel, a steering wheel variant, a joystick, and other operators. A sensor configured to detect an amount of operation or the presence or absence of an operation is attached to the driving operator 80, and a detection result thereof is output to the automated driving control device 100 or some or all of the travel driving force output device 200, the brake device 210, and the steering device 220.

For example, the automated driving control device 100 includes an information processor 110, a first controller 120, a second controller 160, and an information provider 170. Each of these functional parts is implemented, for example, by a hardware processor such as a central processing unit (CPU) executing a program (software). Some or all of these components are implemented, for example, by hardware (a circuit including circuitry) such as large-scale integration (LSI), an application-specific integrated circuit (ASIC), a field-programmable gate array (FPGA), or a graphics-processing unit (GPU) or may be implemented by cooperation between software and hardware. The program may be prestored in a storage device such as an HDD or a flash memory of the automated driving control device 100 (a storage device including a non-transitory storage medium) or prestored in a removable storage medium such as a DVD or a CD-ROM. The program may be installed in an HDD or a flash memory of the automated driving control device 100 when the storage medium (the non-transitory storage medium) is mounted in a drive device. The first controller 120 and the second controller 160 or the first controller 120, the second controller 160, the information processor 110, and the information provider 170 are an example of a "driving controller".

The information processor 110 acquires information output by the vehicle interior recognizer 18, the communication device 20, the vehicle sensor 40, or the like or information acquired thereby and performs a process according to the acquired information. Details of the process will be described below.

Figure 3:
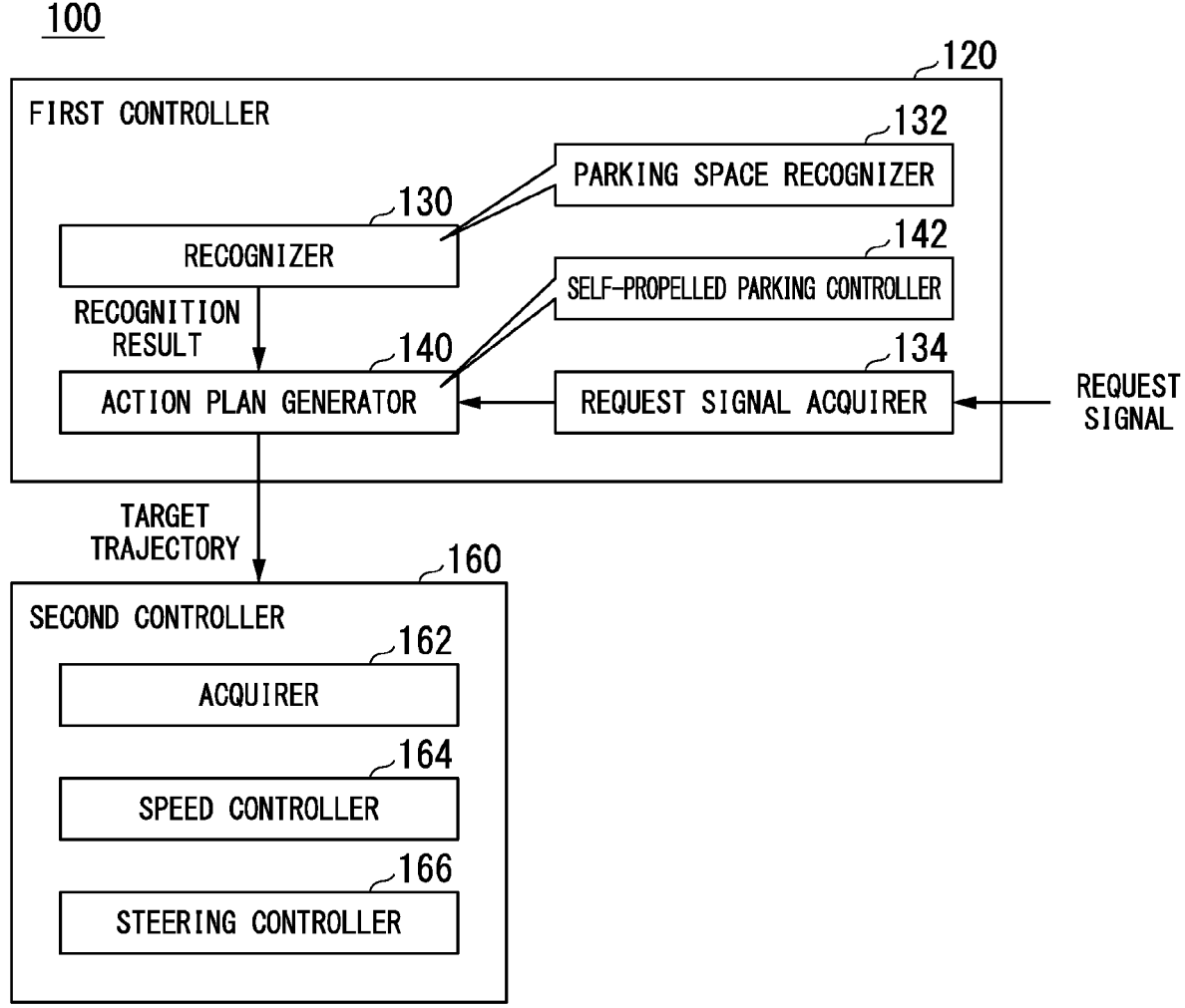
FIG. 3 is a functional configuration diagram of a first controller and a second controller.

FIG. 3 is a functional configuration diagram of the first controller 120 and the second controller 160. The first controller 120 includes, for example, a recognizer 130, a request signal acquirer 134, and an action plan generator 140. For example, the first controller 120 implements a function based on artificial intelligence (AI) and a function based on a previously given model in parallel. For example, an "intersection recognition" function may be implemented by executing intersection recognition based on deep learning or the like and recognition based on previously given conditions (signals, road markings, or the like, with which pattern matching is possible) in parallel and performing comprehensive evaluation by assigning scores to both the recognitions. Thereby, the reliability of automated driving is secured.

The recognizer 130 recognizes a state such as a position, velocity, or acceleration of a physical object present in the vicinity of the host vehicle M on the basis of information input from the camera 10, the radar device 12, and the finder 14 via the physical object recognition device 16. For example, the position of the physical object is recognized as a position on absolute coordinates with a representative point (a center of gravity, a driving shaft center, or the like) of the host vehicle M as the origin and is used for control. The position of the physical object may be represented by a representative point such as a center of gravity or a corner of the physical object or may be represented by a represented region. The "state" of a physical object may include acceleration or jerk of the physical object or an "action state" (for example, whether or not a lane change is being made or intended).

For example, the recognizer 130 recognizes a lane in which the host vehicle M is traveling (a travel lane). For example, the recognizer 130 recognizes the travel lane by comparing a pattern of a road-dividing line (for example, an arrangement of solid lines and broken lines) obtained from the second map information 62 with a pattern of road-dividing lines in the vicinity of the host vehicle M recognized from an image captured by the camera 10. The recognizer 130 may recognize a travel lane by recognizing a traveling path boundary (a road boundary) including a road-dividing line, a road shoulder, a curb stone, a median strip, a guardrail, or the like as well as a road-dividing line. In this recognition, a position of the host vehicle M acquired from the navigation device 50 or a processing result of the INS may be added. The recognizer 130 recognizes a temporary stop line, an obstacle, red traffic light, a toll gate, and other road events.

When the travel lane is recognized, the recognizer 130 recognizes a position or orientation of the host vehicle M with respect to the travel lane. For example, the recognizer 130 may recognize a gap of a reference point of the host vehicle M from the center of the lane and an angle formed with respect to a line connecting the center of the lane in the travel direction of the host vehicle M as a relative position and orientation of the host vehicle M related to the travel lane. Alternatively, the recognizer 130 may recognize a position of the reference point of the host vehicle M related to one side end portion (a road-dividing line or a road boundary) of the travel lane or the like as a relative position of the host vehicle M related to the travel lane.

The recognizer 130 includes a parking space recognizer 132 that is activated in a self-propelled parking event to be described below. Details of the function of the parking space recognizer 132 will be described below.

The request signal acquirer 134 acquires a request signal (an example of a "movement instruction") transmitted by the terminal device 500 of the user via the communication device 20. The request signal is a parking request (a movement instruction), a pick-up request, an access request, or the like which will be described below. The request signal acquirer 134 outputs the acquired request signal to the action plan generator 140. The request signal acquirer 134 is an example of an "acquirer".

The action plan generator 140 generates a future target trajectory along which the host vehicle M automatically travels (independently of a driver's operation) so that the host vehicle M generally travels in the recommended lane determined by the recommended lane determiner 61 and further copes with a surrounding situation of the host vehicle M. For example, the target trajectory includes a speed element. For example, the target trajectory is represented by sequentially arranging points (trajectory points) at which the host vehicle M is required to arrive. The trajectory point is a point where the host vehicle M is required to reach for each prescribed traveling distance (for example, about several meters [m]) along a road. In addition, a target speed and target acceleration for each prescribed sampling time (for example, about several tenths of a second [sec]) are generated as parts of the target trajectory. The trajectory point may be a position at which the host vehicle M is required to arrive at the sampling time for each prescribed sampling time. In this case, information about the target speed or the target acceleration is represented by an interval between the trajectory points.

The action plan generator 140 may set an automated driving event when the target trajectory is generated. The automated driving event includes a constant-speed traveling event, a low-speed following traveling event, a lane change event, a branching event, a merging event, a takeover event, a self-propelled parking event for parking the vehicle according to automated travel (automated driving) without depending upon an operation of the driver in a valet parking or the like, a self-propelled pick-up event in which the vehicle automatically travels in a valet parking or the like, leaves a parking area, and is self-propelled to a prescribed getting-into area, and the like. The action plan generator 140 generates a target trajectory according to the activated event. For example, the action plan generator 140 sets the self-propelled parking event or the self-propelled pick-up event on the basis of a request signal output by the request signal acquirer 134. The action plan generator 140 includes a self-propelled parking controller 142 that is activated when the self-propelled parking event is executed. Details of the function of the self-propelled parking controller 142 will be described below.

The second controller 160 controls the travel driving force output device 200, the brake device 210, and the steering device 220 so that the host vehicle M passes through the target trajectory generated by the action plan generator 140 at a scheduled time.

Returning to FIG. 3, the second controller 160 includes, for example, an acquirer 162, a speed controller 164, and a steering controller 166. The acquirer 162 acquires information of a target trajectory (a trajectory point) generated by the action plan generator 140 and causes the acquired information to be stored in a memory (not shown). The speed controller 164 controls the travel driving force output device 200 or the brake device 210 on the basis of speed elements associated with the target trajectory stored in the memory. The steering controller 166 controls the steering device 220 in accordance with a curvature representing a degree of curve of a target trajectory stored in the memory. For example, processes of the speed controller 164 and the steering controller 166 are implemented by a combination of feed-forward control and feedback control. As one example, the steering controller 166 combines and executes feed-forward control according to the curvature of the road in front of the host vehicle M and feedback control based on a gap from the target trajectory.

When the request signal acquirer 134 has acquired the request signal and the vehicle interior recognizer 18 has recognized a physical object placed in the interior of the vehicle, the information provider 170 provides information indicating that the physical object is left behind in the interior of the vehicle to the terminal device of the user.

The travel driving force output device 200 outputs a travel driving force (a torque) to driving wheels so as to enable the vehicle to travel. For example, the travel driving force output device 200 includes a combination of an internal combustion engine, an electric motor, a transmission, and the like, and an electronic control unit (ECU) configured to control them. The ECU controls the above-described configuration in accordance with information input from the second controller 160 or information input from the driving operator 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with information input from the second controller 160 or information input from the driving operator 80 so that a brake torque corresponding to a braking operation is output to each wheel. The brake device 210 may include a mechanism for transferring the hydraulic pressure generated by the operation of the brake pedal included in the driving operator 80 to the cylinder via the master cylinder as a backup. The brake device 210 is not limited to the above-described configuration and may be an electronically controlled hydraulic brake device that controls an actuator in accordance with information input from the second controller 160 and transfers the hydraulic pressure of the master cylinder to the cylinder.

For example, the steering device 220 includes a steering ECU and an electric motor. The electric motor, for example, changes a direction of the steering wheels by applying a force to a rack and pinion mechanism. The steering ECU drives the electric motor and causes the direction of the steering wheels to be changed in accordance with the information input from the second controller 160 or the information input from the driving operator 80.

[Self-Propelled Parking Event-Entering Time]

Figure 4:
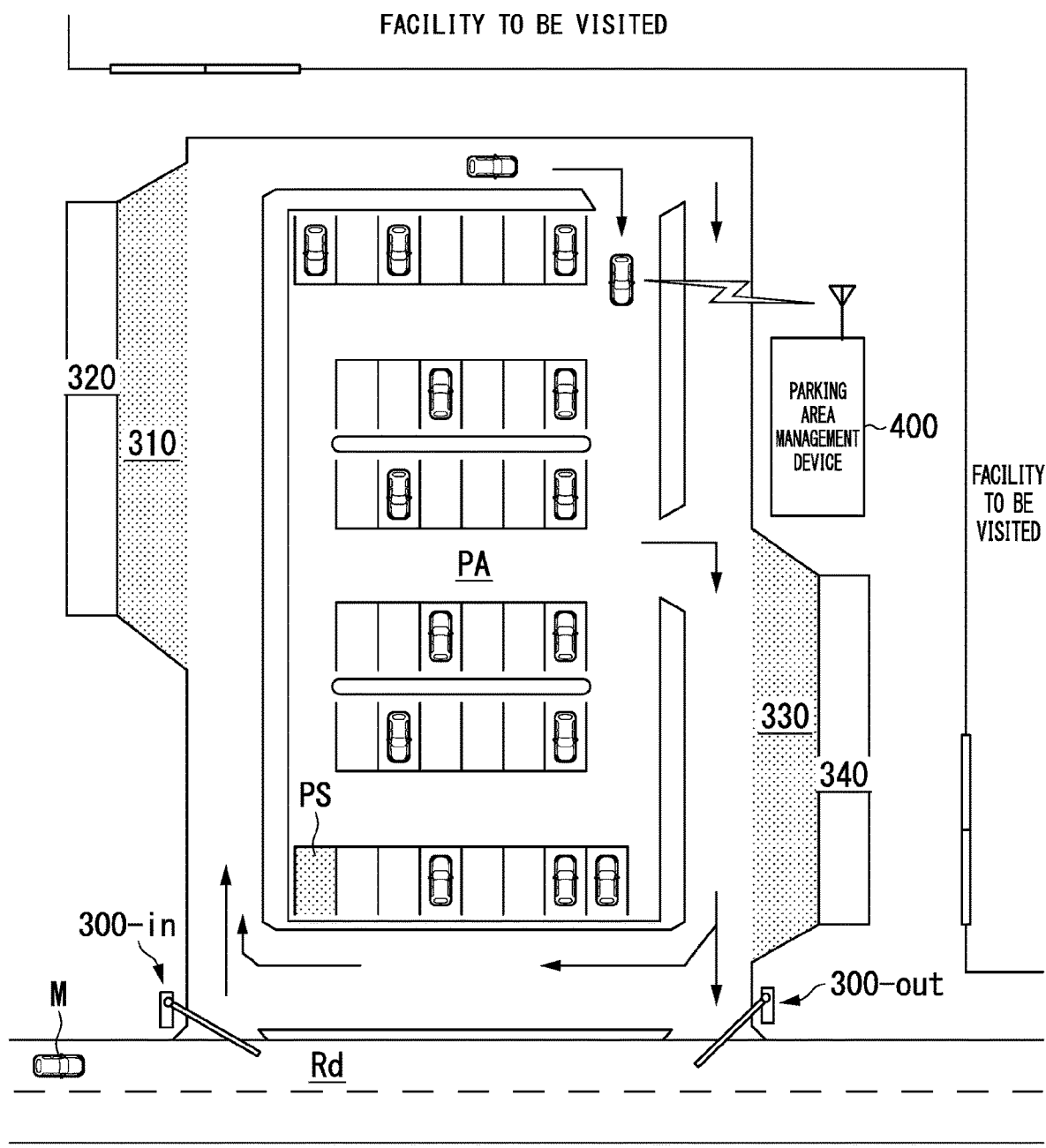
FIG. 4 is a diagram schematically showing a scene in which a self-propelled parking event is executed.

The self-propelled parking controller 142 causes the host vehicle M to be parked in a parking space, for example, on the basis of information acquired from the parking area management device 400 by means of the communication device 20. FIG. 4 is a diagram schematically showing a scene in which a self-propelled parking event is executed. A gate 300-*in* is provided on a route from a road Rd to a facility to be visited to be visited. The host vehicle M moves to the stopping area 310 after passing through the gate 300-*in* according to manual driving or automated driving. The stopping area 310 faces a getting-out area 320 provided near the entrance of the facility to be visited. In the getting-out area 320, for example, a cover for avoiding rain and snow is provided.

The host vehicle M starts a self-propelled parking event for performing automated driving after the occupant gets out of the host vehicle M in the stopping area 310 and moving the host vehicle M to a parking space PS within a parking area PA. For example, a start trigger of the self-propelled parking event may be any operation of the occupant or may be the reception of a prescribed signal from the parking area management device 400 in a wireless manner. In the following description, the start trigger is assumed to be a signal transmitted by the terminal device 500 as an example. When the self-propelled parking event is started, the self-propelled parking controller 142 controls the communication device 20 so that a parking request is transmitted to the parking area management device 400. The host vehicle M moves from the stopping area 310 to the parking area PA according to guidance of the parking area management device 400 or while performing sensing by itself.

Figure 5:
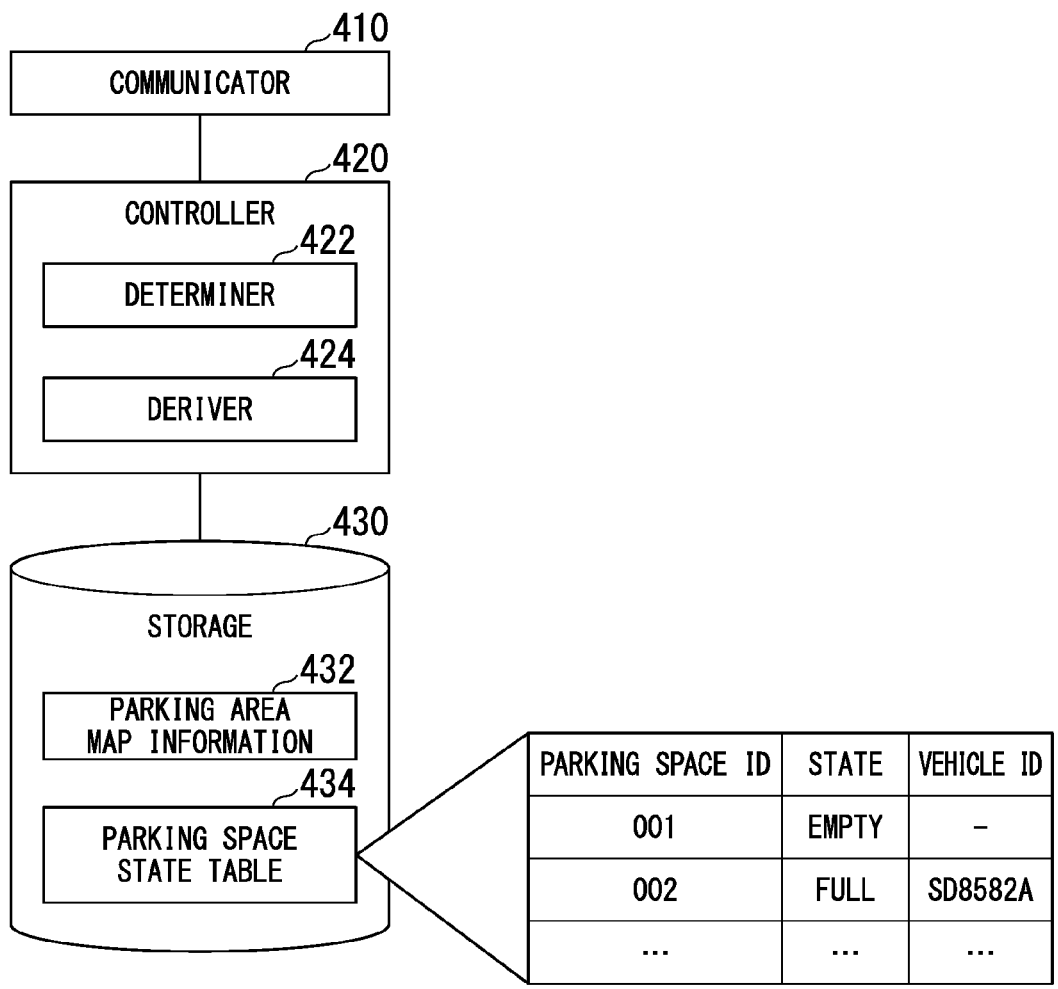
FIG. 5 is a diagram showing an example of a configuration of a parking area management device.

FIG. 5 is a diagram showing an example of a configuration of the parking area management device 400. The parking area management device 400 includes, for example, a communicator 410, a controller 420, and a storage 430. The storage 430 stores information such as parking area map information 432, a parking space state table 434, and the like.

The communicator 410 wirelessly communicates with the host vehicle M and other vehicles (or the terminal device 500). The controller 420 guides the vehicle to the parking space PS on the basis of information acquired by the communicator 410 and information stored in the storage 430. The parking area map information 432 is information that geometrically represents a structure of the parking area PA. The parking area map information 432 includes coordinates for each parking space PS. For example, a parking space state which is an empty state or a full (parked) state and vehicle ID is associated with a parking space ID that is identification information of the parking space PS in the parking space state table 434. For example the vehicle ID is the identification information of the parked vehicle in the parking space.

The controller 420 includes, for example, a determiner 422 and a deriver 424. When the communicator 410 receives a parking request from the vehicle, the controller 420 refers to the parking space state table 434, extracts a parking space PS in an empty state, acquires a position of the extracted parking space PS from the parking area map information 432, and transmits a suitable route to the acquired position of the parking space PS to the vehicle using the communicator 410. The controller 420 instructs a specific vehicle to stop or slow down as necessary so that vehicles do not move to the same position at the same time on the basis of a positional relationship between a plurality of vehicles.

In the vehicle receiving the route (hereinafter referred to as the host vehicle M), the self-propelled parking controller 142 generates a target trajectory based on the route. When the host vehicle M approaches the target parking space PS, the parking space recognizer 132 recognizes parking frame lines for partitioning the parking spaces PS and the like, recognizes a detailed position of the parking space PS, and provides the recognized position to the self-propelled parking controller 142. The self-propelled parking controller 142 receives the position, corrects the target trajectory, and causes the host vehicle M to be parked in the parking space PS.

The determiner 422 determines a meeting point (an accessible area) where the user of the terminal device 500 and the host vehicle M may meet, which will be described below, on the basis of position information of the host vehicle M, position information of the terminal device 500, and the like. The "accessible area" includes a meeting point where the user and the host vehicle M can meet such that the user may take a specific physical object out of the interior of the vehicle after the self-propelled parking event is started and the host vehicle M moves to the parking area. [Process of deriving accessible area] will be described below. The "accessible area" is, for example, an area different from a parking area. The "accessible area" is, for example, the getting-out area 320 or a getting-into area 340 to be described below. The getting-out area 320 is, for example, a getting-out area where the user in the host vehicle M gets out of the host vehicle M when the host vehicle M is moved to a parking area according to automated driving. The getting-into area 340 is a getting-into area where the user gets into the host vehicle M when the host vehicle M parked in the parking area leaves according to automated driving. The "accessible area" may be, for example, an area where the host vehicle M can be stopped different from the getting-out area 320 or the getting-into area 340 to be described below. The deriver 424 derives a degree of congestion of a prescribed area within the parking area. Details of the processes of the determiner 422 and the deriver 424 will be described below in detail.

[Self-Propelled Parking Event-Leaving Time]

The self-propelled parking controller 142 and the communication device 20 maintain an operating state even when the host vehicle M is parked. For example, when the communication device 20 has received a pick-up request from the terminal device 500 of the occupant, the self-propelled parking controller 142 causes the system of the host vehicle M to be activated and causes the host vehicle M to move to a stopping area 330 shown in FIG. 4. The stopping area 330 faces the getting-into area 340 provided near the exit of the facility to be visited. In the getting-into area 340, for example, a cover, roof or fence for avoiding rain and snow is provided.

When the host vehicle M is moved to the stopping area 330, the self-propelled parking controller 142 controls the communication device 20 such that a start request is transmitted to the parking area management device 400. The controller 420 of the parking area management device 400 instructs a specific vehicle to stop or slow down as necessary so that vehicles do not move to the same position at the same time on the basis of a positional relationship between a plurality of vehicles as at the entering time. When the host vehicle M is moved to the stopping area 330 and the occupant gets into the host vehicle M, the self-propelled parking controller 142 stops its operation and manual driving or automated driving by another functional part is started thereafter. Then, the vehicle travels on the road Rd through a gate 300-*out* provided between the stopping area 330 and the road Rd.

The present invention is not limited to the above description, and the self-propelled parking controller 142 may find a parking space in an empty state by itself on the basis of detection results from the camera 10, the radar device 12, the finder 14, or the physical object recognition device 16 without depending upon communication and cause the host vehicle M to be parked within the found parking space.

[Movement Process (Part 1)]

The automated driving control device 100 acquires a parking request signal (a movement instruction) to be output on the basis of an action of a user who has not got into the host vehicle M, wherein the parking request signal causes the host vehicle M to move to the parking area according to automated driving (or automated travel), and causes the host vehicle M to move to an accessible area where the user can have access when a physical object placed in the interior of the host vehicle M has been recognized by the vehicle interior recognizer 18. Hereinafter, the present process is referred to as a "movement process". In the process of moving the host vehicle M to the parking area according to the automated driving or the movement process, an occupant may be present in the interior of the host vehicle M or no occupant may be present in the interior of the host vehicle M.

Figure 6:
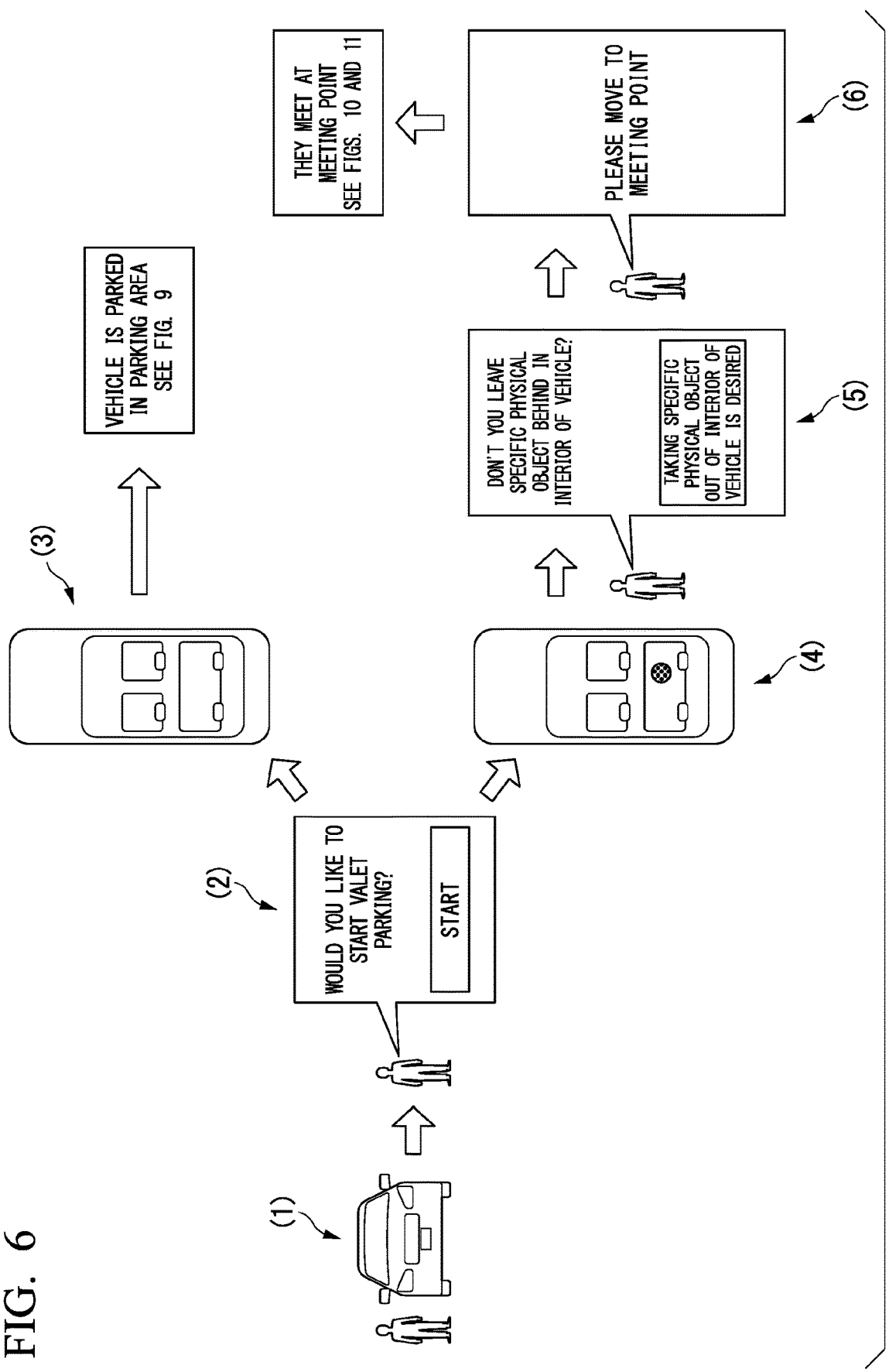
FIG. 6 is an explanatory diagram showing an overview of a movement process.

FIG. 6 is an explanatory diagram showing an overview of the movement process. For example, in the stopping area 310, the user of the vehicle gets out of the host vehicle M (1) and operates the terminal device 500 to transmit a parking request to the host vehicle M (2). When the above-described processing of (2) has been performed, the host vehicle M is parked within the parking space according to automatic driving if a physical object estimated to have been left behind in the interior of the vehicle or a physical object (hereinafter, a specific physical object) estimated to be retained by the user at the time of getting out of the host vehicle M is absent (3) (see FIG. 9 to be described below).

If there is a specific physical object in the interior of the vehicle (4) when the above-described processing of (2) has been performed, the automated driving control device 100 of the host vehicle M provides information indicating that the specific physical object is placed in the interior of the vehicle to the terminal device 500 of the user (5). When the user transmits information indicating that he/she desires to take out the specific physical object by operating the terminal device 500 to the automated driving control device 100, the automated driving control device 100 determines a meeting point at which the host vehicle M and the user will meet to take the specific physical object out of the interior of the vehicle and transmits information of the determined meeting point to the terminal device 500 of the user (6). The user and the host vehicle M move to the meeting point according to automated driving (see FIGS. 10 and 11 to be described below).

[Flowchart]

Figure 7:
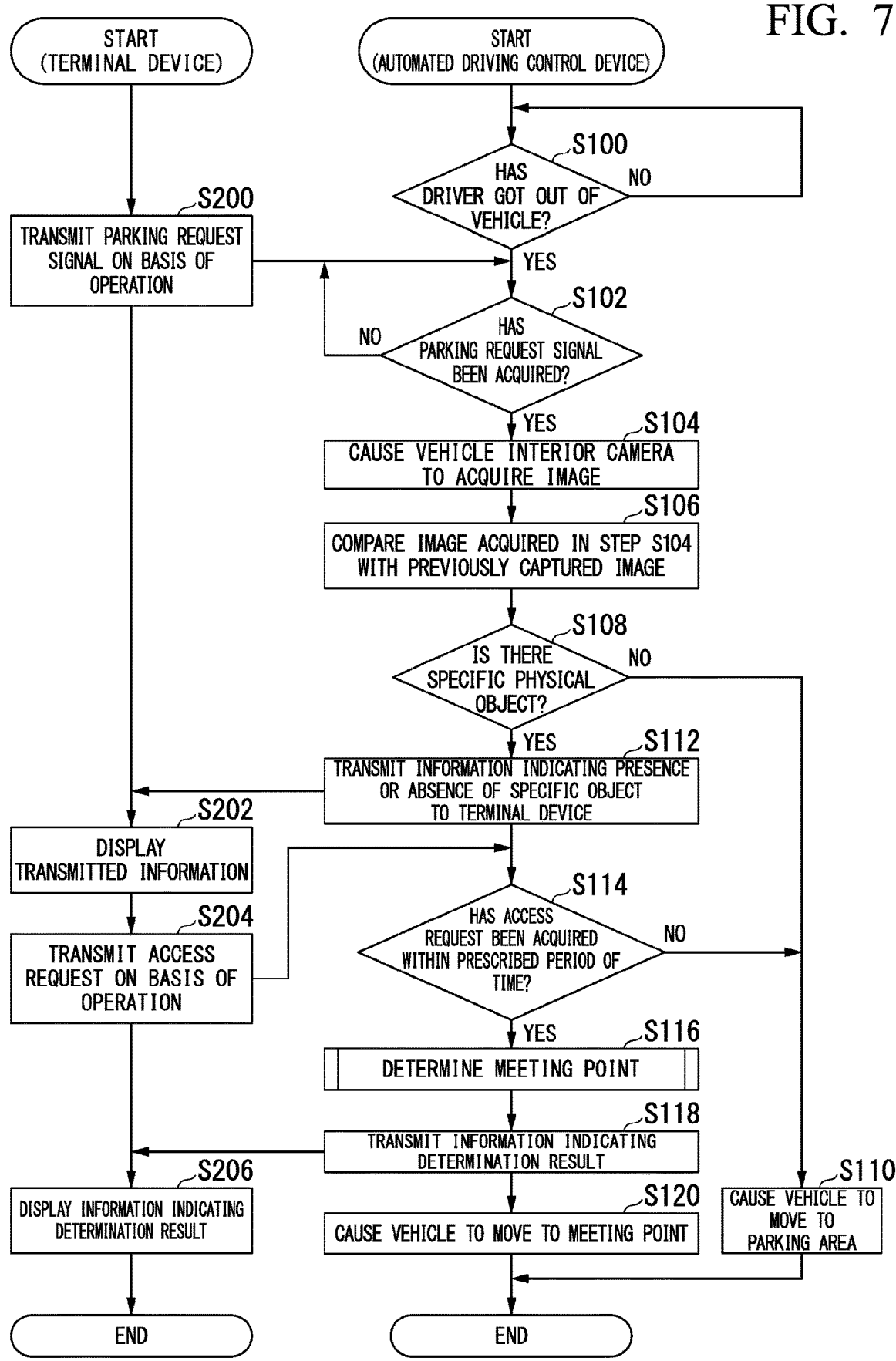
FIG. 7 is a flowchart showing an example of a flow of a process to be executed by a terminal device and an automated driving control device.

FIG. 7 is a flowchart showing an example of a flow of a process to be executed by the terminal device 500 and the automated driving control device 100. For example, the present process is a process to be executed when the host vehicle M has been stopped in the stopping area 310.

First, the information processor 110 of the automated driving control device 100 determines whether or not the driver (or all occupants) of the host vehicle M has (or have) got out of the host vehicle M on the basis of detection results of the vehicle sensors 40 or recognition results of the vehicle interior recognizer 18 (step S100). For example, when a door of the driver's seat is closed and locked after the door is unlocked and opened, the information processor 110 may determine that the driver has got out of the host vehicle M. When it is determined that the driver is not present in the driver's seat on the basis of a recognition result of the vehicle interior recognizer 18, the information processor 110 may determine that the driver has got out of the vehicle. When it is determined whether or not all the occupants have got out of the vehicle, the information processor 110 determines that all the occupants have got out of the vehicle when determining that there are no occupants in the interior of the vehicle on the basis of a recognition result of the vehicle interior recognizer 18.

Next, it is determined whether or not the request signal acquirer 134 of the automated driving control device 100 has acquired a parking request signal from the terminal device 500 (step S102). When the user getting out of the host vehicle M performs a prescribed operation on the terminal device 500, the terminal device 500 transmits the parking request signal to the automated driving control device 100 (step S200). The user getting out of the host vehicle M is an example of a "user who has not got into the vehicle". That is, the user getting out of the host vehicle M is a "user getting into the vehicle immediately before the movement instruction is acquired". The automated driving control device 100 can determine whether the user of the terminal device 500 transmitting the parking request signal is a user getting into the host vehicle M on the basis of the parking request signal. In this case, for example, corresponding information in which the parking request signal is associated with information based on an image obtained by imaging the user is stored in the storage. The automated driving control device 100 determines whether or not the user associated with the parking request signal is a user having immediately previously got into the vehicle using an image captured by the vehicle interior camera 17 with reference to the above-described corresponding information.

When the request signal acquirer 134 acquires the parking request signal from the terminal device 500, the information processor 110 causes the vehicle interior camera 17 to acquire an image (step S104). Next, the information processor 110 causes the vehicle interior recognizer 18 to analyze the image captured in step S104 and recognize the state of the interior of the vehicle. The information processor 110 causes the vehicle interior recognizer 18 to compare the above-described recognition result with a recognition result obtained by analyzing a previous image (step S106) and determine whether or not there is a specific physical object in the interior of the vehicle on the basis of a comparison result. Then, the vehicle interior recognizer 18 outputs a determination result to the information processor 110. The previous image is an image immediately before the driver (or a plurality of occupants including the driver) getting out of the vehicle in step S100 gets (or get) into the host vehicle M. For example, the information processor 110 causes the vehicle interior camera 17 to acquire an image at a timing when the door has been unlocked in a state in which the driver has not got into the host vehicle M.

Figure 8:
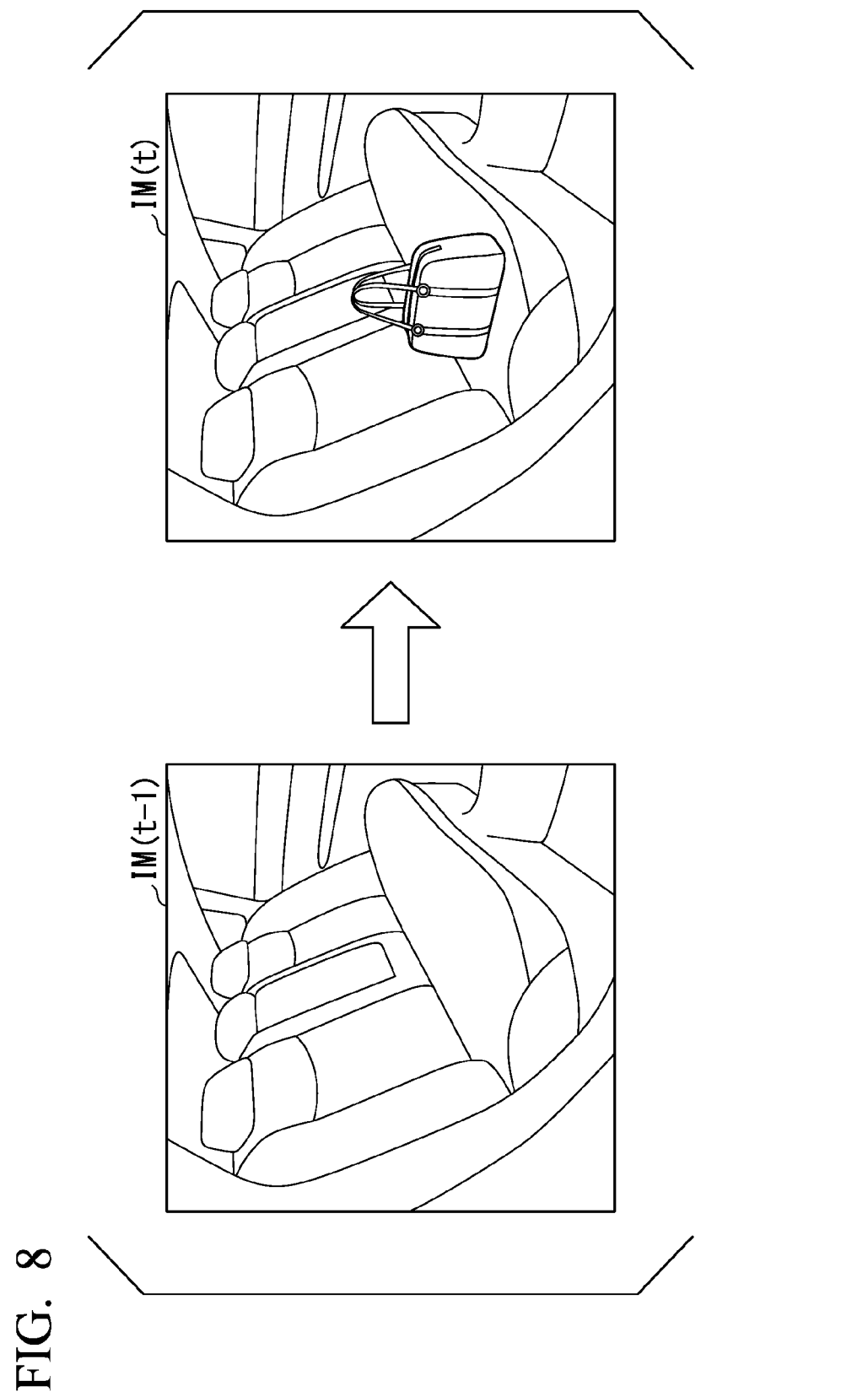
FIG. 8 is a diagram showing an example of an image (IM(t)) captured in step S104 and a previously captured image (IM(t−1)).

Next, the information processor 110 acquires a determination result of the vehicle interior recognizer 18 and determines whether or not there is a specific physical object on the basis of the acquired determination result (step S108). That is, when the user in the vehicle has got out of the vehicle, it is determined whether or not a physical object is placed in the interior of the vehicle. FIG. 8 is a diagram showing an example of an image (IM(t)) captured in step S104 and a previously captured image (IM(t−1)). For example, although no bag is placed on a seat in the previous image, a bag is placed on the seat after the occupant gets into the vehicle. When the occupant gets out of the vehicle in a state in which the bag is present, the bag is estimated to be an object (a specific physical object) which is left behind.

Figure 9:
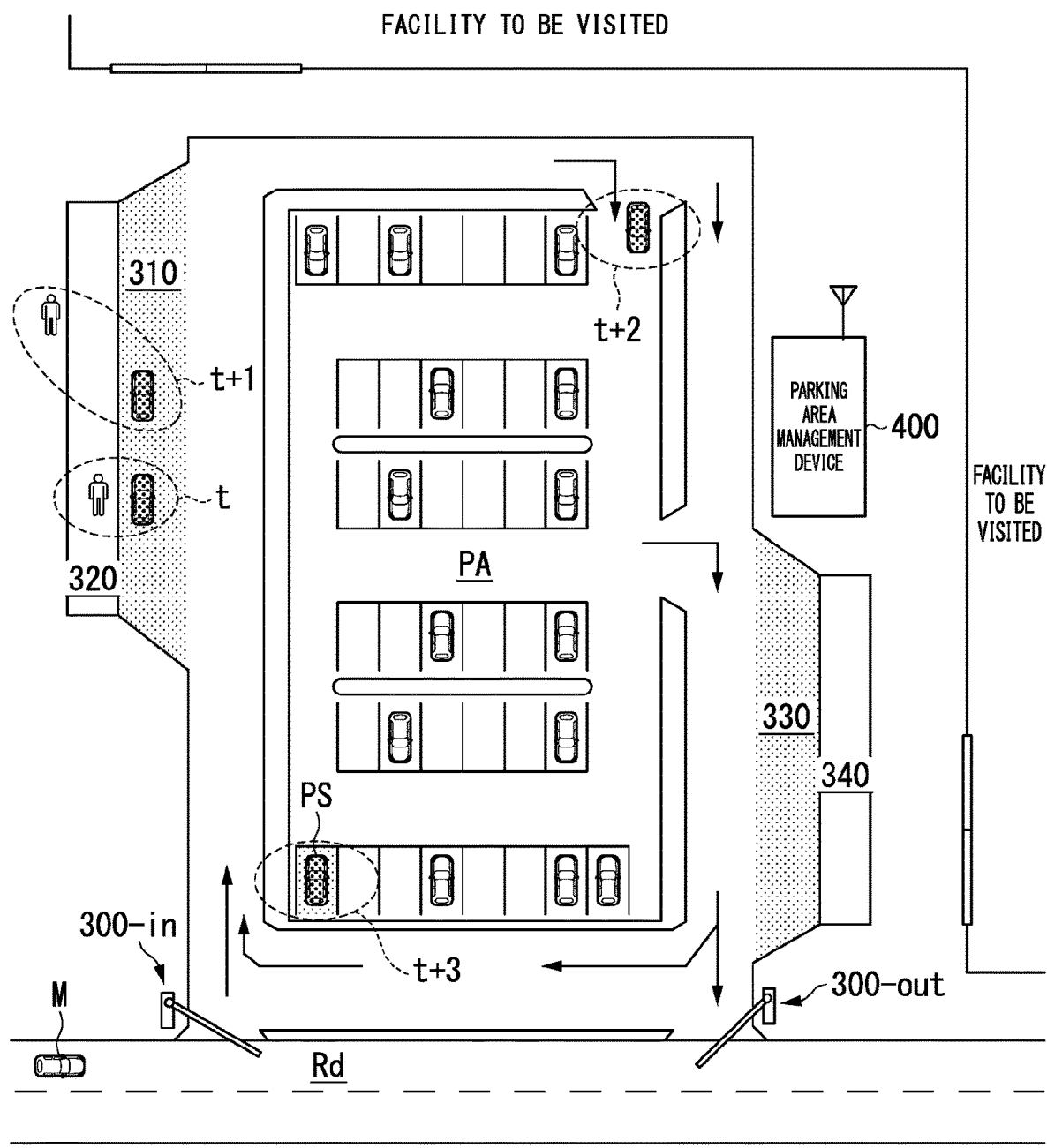
FIG. 9 is a diagram showing an example of the behavior of a host vehicle M when there is no specific physical object.

When there is no specific physical object, the action plan generator 140 causes the host vehicle M to be moved in the parking area (step S110). FIG. 9 is a diagram showing an example of the behavior of the host vehicle M when there is no specific physical object. For example, when it is determined that there is no specific physical object at time t+1 after the occupant gets out of the vehicle at time t, the host vehicle M enters the entrance of the parking area at time t+2 and is parked in the parking space PS at time t+3. In this manner, the automated driving control device 100 causes the host vehicle M to move to the parking area without causing the host vehicle M to move to the accessible area capable of being accessed by the user when a parking request signal has been acquired and the specific physical object placed in the interior of the vehicle has not been recognized. Because the host vehicle M is parked in the parking space PS according to automated driving, convenience for the user is improved.

Returning to the description of FIG. 7, when a specific physical object is present in step S108, the information provider 170 of the automated driving control device 100 transmits information indicating that a specific physical object is present to the terminal device 500 (step S112). That is, the information provider 170 provides information indicating that a specific physical object has been left behind in the interior of the vehicle to the terminal device 500 of the user. When a specific physical object is present, a process in which the host vehicle M is parked in the parking space PS according to automated driving is interrupted.

When it is determined that all the occupants have not got out of the vehicle in the determination of step S100 (when an occupant is present in the interior of the vehicle), the automated driving control device 100 may not receive the parking request regardless of the presence or absence of a specific physical object if the parking request has been transmitted by the terminal device 500 in step S102. Not receiving indicates that the automated driving control device 100 does not perform the movement process according to the acquisition of the parking request. In this case, for example, the automated driving control device 100 causes the host vehicle M to stay at a place. The automated driving control device 100 transmits information indicating that an occupant is present in the interior of the vehicle (together with information indicating that a specific physical object is present) to the terminal device 500. When the user of the terminal device 500 has transmitted instruction information for issuing an instruction for performing the movement process to the automated driving control device 100 after recognizing that an occupant is present in the interior of the vehicle by operating the terminal device 500, the automated driving control device 100 may execute the movement process in accordance with the acquisition of the instruction information. In this manner, when an occupant is present in the interior of the vehicle, the movement process is executed when the user has explicitly issued an instruction for executing the movement process even though an occupant is present in the interior of the vehicle.

When the terminal device 500 acquires the information transmitted in step S112, the above-described transmitted information is displayed on the display of the terminal device 500 (step S202). The display displays, for example, text indicating that a specific physical object is present and an image including the specific physical object (for example, an image such as IM(t) in FIG. 8). The display displays an image for inquiring whether or not the specific physical object is desired to be taken out of the interior of the vehicle. In this case, when the occupant getting out of the vehicle performs an operation of transmitting information indicating that he/she desires to take the specific physical object out of the interior of the vehicle, the terminal device 500 transmits an access request to the host vehicle M on the basis of the operation (step S204). The access request is a request for moving the host vehicle M to an accessible area.

Next, the action plan generator 140 determines whether or not an access request has been acquired within a prescribed period of time after the processing of step S112 was performed (step S114). When an access request has not been acquired within the prescribed period of time, the process proceeds to the processing of step S110.

When an access request has been acquired within the prescribed period of time, the information processor 110 determines a meeting point (an accessible area) (step S116). A process related to the determination of the meeting point will be described below. Next, the information provider 170 transmits information indicating a determination result to the terminal device 500 (step S118).

The terminal device 500 causes the display to display information indicating the determination result transmitted in step S118 (step S206). After the processing of step S118, the action plan generator 140 causes the host vehicle M to move to the meeting point (step S120). Thereby, the process of one routine of the present flowchart is completed.

When the host vehicle M has moved to the meeting point in the processing of step S120, the specific physical object is taken out of the interior of the vehicle by the user and the user operates the terminal device 500 and the host vehicle M moves to the parking area again when a parking request has been transmitted to the host vehicle M.

After the information indicating the determination result is transmitted to the terminal device 500, the action plan generator 140 may cause the host vehicle M to move to the meeting point when information indicating agreement about the determination result has been transmitted from the terminal device 500. When an agreement about the determination result has not been reached, an alternative may be transmitted to the terminal device 500. The information provider 170 may provide a plurality of meeting points to the user. In this case, the action plan generator 140 causes the host vehicle M to move to the meeting point selected by the user.

Within a prescribed period of time after the information provider 170 transmits information indicating the determination result to the terminal device 500, the action plan generator 140 may cause the host vehicle M to move to the parking area without moving the host vehicle M to the meeting point when information indicating an agreement about the determination result has not been acquired from the terminal device 500.

Figure 10:
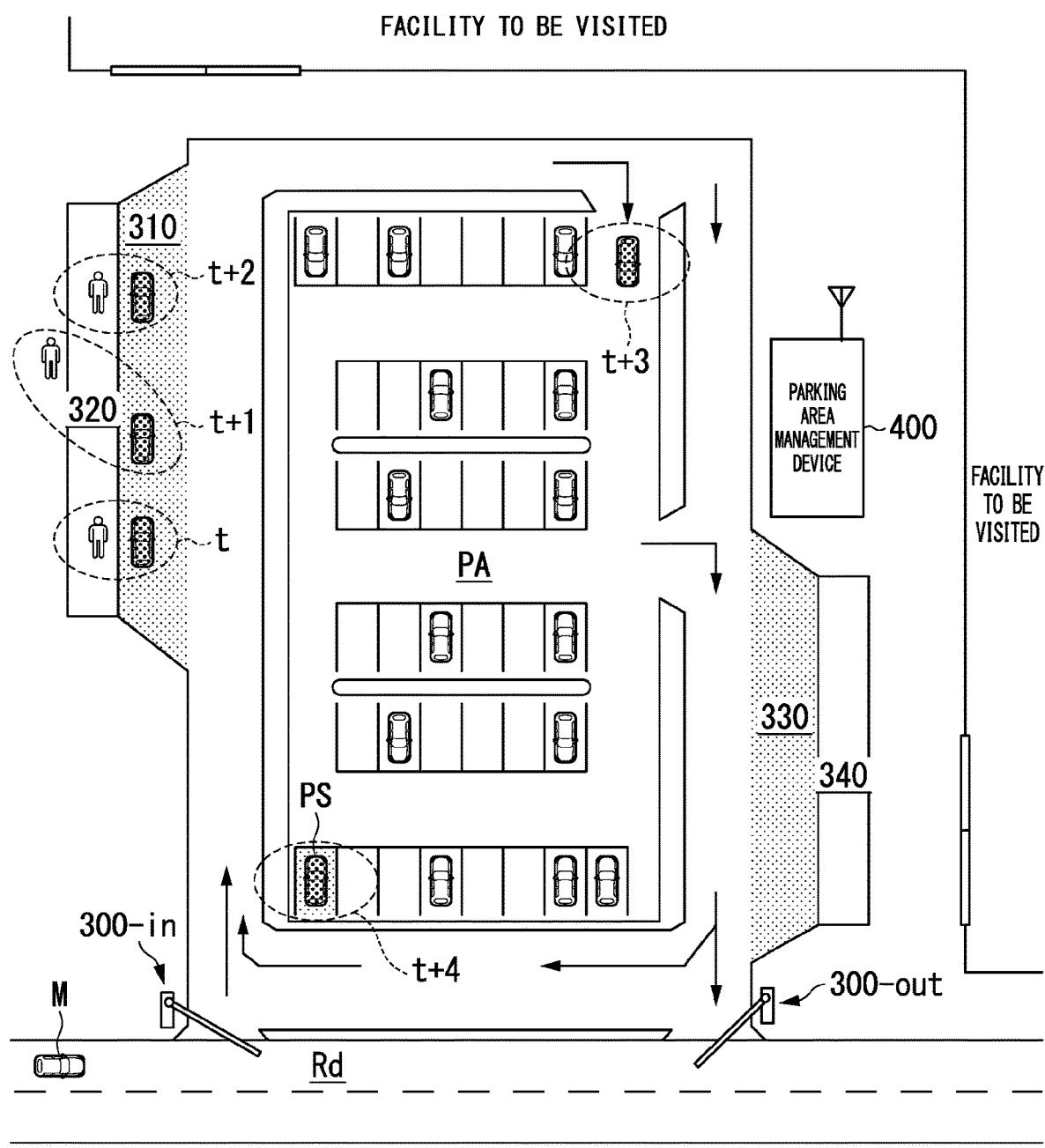
FIG. 10 is a diagram showing an example of the behavior of the host vehicle M when there is a specific physical object.

FIG. 10 is a diagram showing an example of the behavior of the host vehicle M when a specific physical object is present. For example, when it is determined that the specific physical object is present at time t+1 after the occupant gets out of the vehicle at time t, the host vehicle M stops at the meeting point (the stopping area 310) at time t+2 and meets the user. After the specific physical object is taken out of the interior of the vehicle, the user operates the terminal device 500 and transmits a parking request to the host vehicle M. When the host vehicle M acquires the parking request, the host vehicle M starts movement toward the parking area, enters the entrance of the parking area at time t+3, and is parked in the parking space PS at time t+4.

In this manner, when a specific physical object is present, the automated driving control device 100 causes the host vehicle M to move to the meeting point so that the user can easily take the specific physical object out of the interior of the vehicle. Because the vehicle is parked in the parking space PS according to automated driving when the parking request has been acquired again, convenience for the user is improved.

The automated driving control device 100 causes the host vehicle M to move to the parking area when a prescribed period of time has elapsed from the time of movement of the host vehicle M to the meeting point by the user according to automated driving. For example, if the host vehicle M has arrived at the meeting point but the user has not appeared at the meeting point even when the prescribed period of time has elapsed, the host vehicle M is moved to the parking area and the occurrence of congestion is minimized.

The automated driving control device 100 may cause the host vehicle M to stay at a place instead of (or in addition to) moving the host vehicle M to the accessible area. For example, when the driver of the host vehicle M has recognized that a specific physical object is present in the interior of the vehicle within a prescribed period of time (from several seconds to several tens of seconds) after getting out of the vehicle, the automated driving control device 100 may cause the host vehicle M to stay at a place.

[Movement Process (Part 2)]

Although the getting-out area 320 is set as the meeting point in [Movement process (part 1)] described above, the getting-out area 320 or the getting-into area 340 is set as the meeting point in [Movement process (part 2)]. For example, the automated driving control device 100 changes a route for allowing the user to move the host vehicle to the accessible area according to automated driving on the basis of position information of the user and position information related to the host vehicle M. For example, the automated driving control device 100 causes the vehicle to move to a meeting point of an area close to the user's position among a plurality of meeting points on the basis of the position information of the user and the position information related to the host vehicle M. In other words, the route along which the vehicle moves or the speed while moving (or at the time of movement) is changed on the basis of the position information of the user and the position information related to the host vehicle M. The change in the speed while moving (or at the time of movement) means that the speed is changed so that the vehicle moves in accordance with the arrival time of the user at the meeting point.

Figure 11:
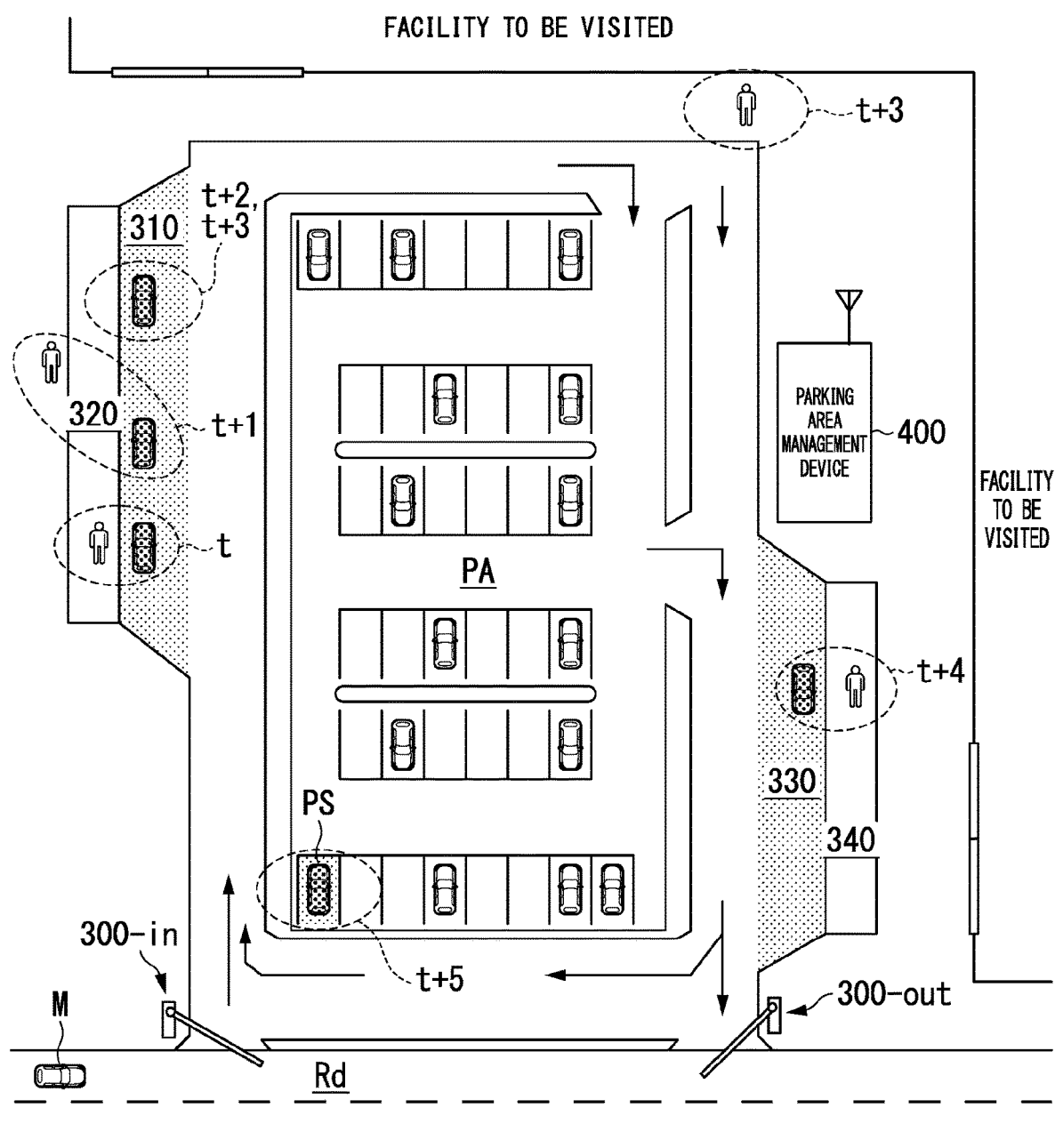
FIG. 11 is a diagram showing an example of a scene in which a getting-into area becomes a meeting point.

FIG. 11 is a diagram showing an example of a scene in which the getting-into area 340 becomes a meeting point. Description similar to that of FIG. 10 will be omitted. For example, it is determined that the specific physical object is present at time t+1, and it is assumed that information indicating that a specific physical object is present in the interior of the vehicle has been transmitted to the terminal device 500 at time t+2. In this case, the user holding the terminal device 500 does not notice the above-described notification and notices the notification at time t+3. In this case, because the position of the user is closer to the getting-into area 340 than to the getting-out area 320, the automated driving control device 100 determines the meeting point as the getting-into area 340 and causes the host vehicle M to move to the getting-into area 340. In this case, the host vehicle M moves in accordance with the arrival time of the user at the meeting point. For example, the automated driving control device 100 controls the speed of the host vehicle M so that the host vehicle M can arrive at the meeting point before the user arrives at the meeting point.

At time t+4, the host vehicle M and the user meet in the getting-into area 340 and the user takes a specific physical object out of the interior of the vehicle and transmits a parking request to the automated driving control device 100. When the automated driving control device 100 acquires the parking request, the automated driving control device 100 causes the host vehicle M to enter the entrance of the parking area after passing through the getting-out area 320 again and to be parked in the parking space PS at time t+5.

In this manner, when a specific physical object is present, the automated driving control device 100 causes the host vehicle M to move to a meeting point close to the user so that the user can easily take the specific physical object out of the interior of the vehicle. Because the user can take the specific physical object out of the interior of the vehicle at the meeting point where a movement distance is short, convenience for the user is further improved.

The meeting point is determined by, for example, the parking area management device 400 or the automated driving control device 100 (for example, the information processor 110). In the following description, an example in which the parking area management device 400 determines a meeting point will be described. When the meeting point is determined, the automated driving control device 100 performs a process equivalent to the process performed by the parking area management device 400 to be described below.

Figure 12:
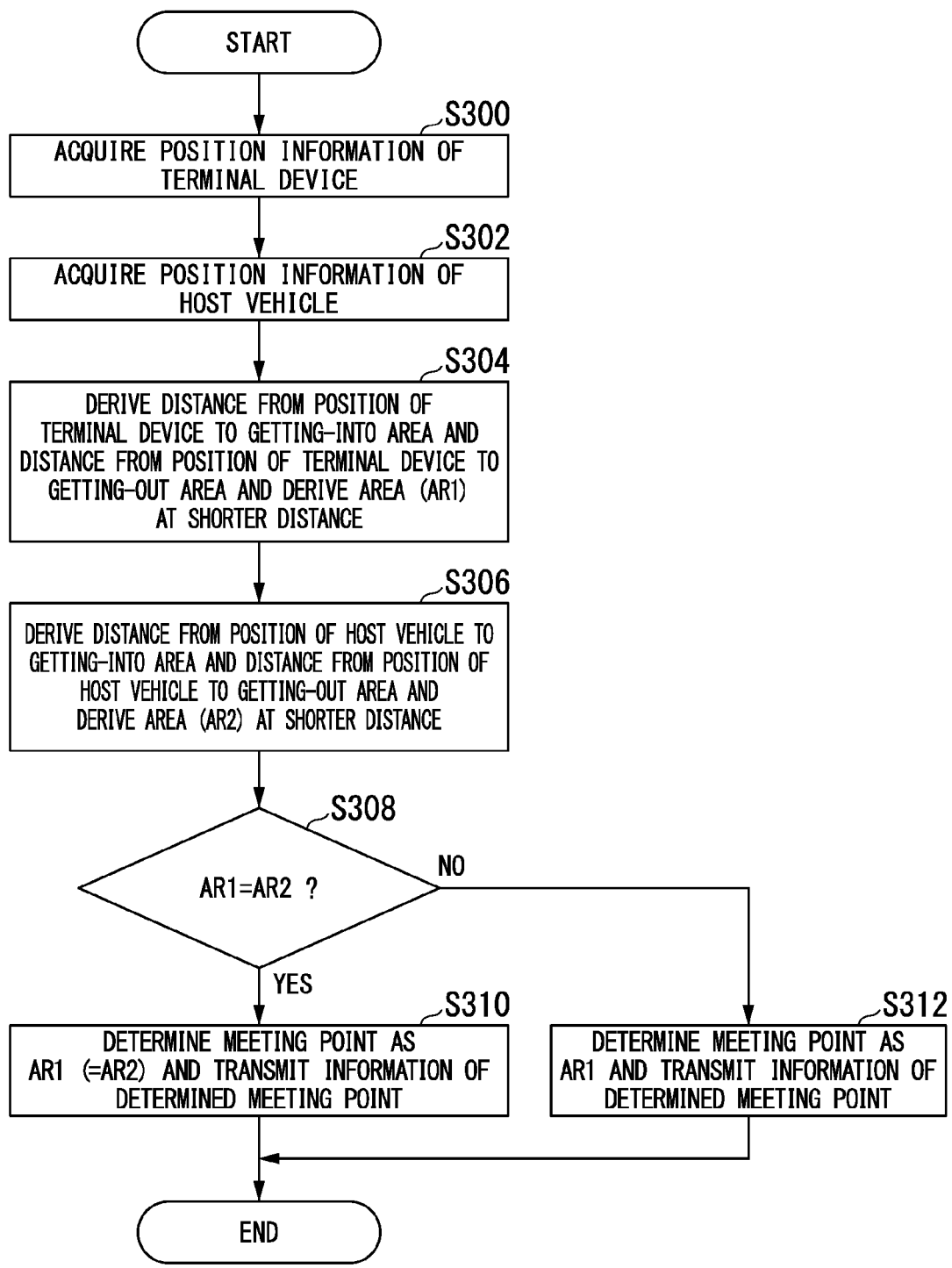
FIG. 12 is a flowchart showing an example of a flow of a process to be executed by the automated driving control device.

FIG. 12 is a flowchart showing an example of a flow of a process to be executed by the automated driving control device 100. First, the determiner 422 of the controller 420 acquires position information of the terminal device 500 (step S300). Next, the determiner 422 acquires the position information of the host vehicle M (step S302).

Next, the determiner 422 derives a distance from the position of the terminal device 500 to the getting-into area 340 and a distance from the position of the terminal device 500 to the getting-out area 320 and determines an area AR1 of a shorter distance between the two distances (step S304).

Next, the determiner 422 derives a distance from the position of the host vehicle M to the getting-into area 340 and a distance from the position of the host vehicle M to the getting-out area 320 and determines an area AR2 of a shorter distance between the two distances (step S306).

Next, the determiner 422 determines whether or not the area AR1 determined in step S304 matches the area AR2 determined in step S306 (step S308). When the area AR1 and the area AR2 match, the determiner 422 determines the matching area as a meeting point and transmits information about the determined meeting point to the host vehicle M (step S310). The terminal device 500 may acquire information of the area of the meeting point from the parking area management device 400 instead of the host vehicle M.

When the area AR1 and the area AR2 do not match, the determiner 422 determines the area AR1 close to the user of the terminal device 500 as the meeting point and transmits information of the determined meeting point to the host vehicle M (step S312). Thereby, the process of one routine of the present flowchart is completed.

In the determination of the meeting point, in addition to the movement distance, a degree of difficulty of movement may be taken into account. For example, the storage 430 of the parking area management device 400 stores information indicating the degree of difficulty in the case of movement from a prescribed position to the getting-out area 320 or the getting-into area 340. The determiner 422 may perform a statistical process on an index based on the movement distance and an index based on the degree of difficulty in the case of movement to each area and determine an area to which the user can easily move (an area to which the user can most easily move or an area to which the user can move more easily than other areas) as a meeting point.

In this manner, the parking area management device 400 can determine a suitable meeting point for the user. As a result, convenience for the user is improved.

[Movement Process (Part 3)]

Although the getting-out area 320 is used as the meeting point in [Movement process (part 1)] described above, the meeting point is determined in consideration of the degree of congestion of the getting-out area 320 or the getting-into area 340 in [Movement process (part 3)]. The deriver 424 derives the degree of congestion of the meeting point (an accessible area) for the user and derives an area where the degree of congestion is greater than or equal to a prescribed degree on the basis of a derivation result. The automated driving control device 100 does not cause the host vehicle M to move to a meeting point (an accessible area) having a degree of congestion derived by the deriver 424 greater than or equal to the prescribed degree when a parking request has been acquired and a specific physical object placed in the interior of the vehicle has been recognized.

Figure 13:
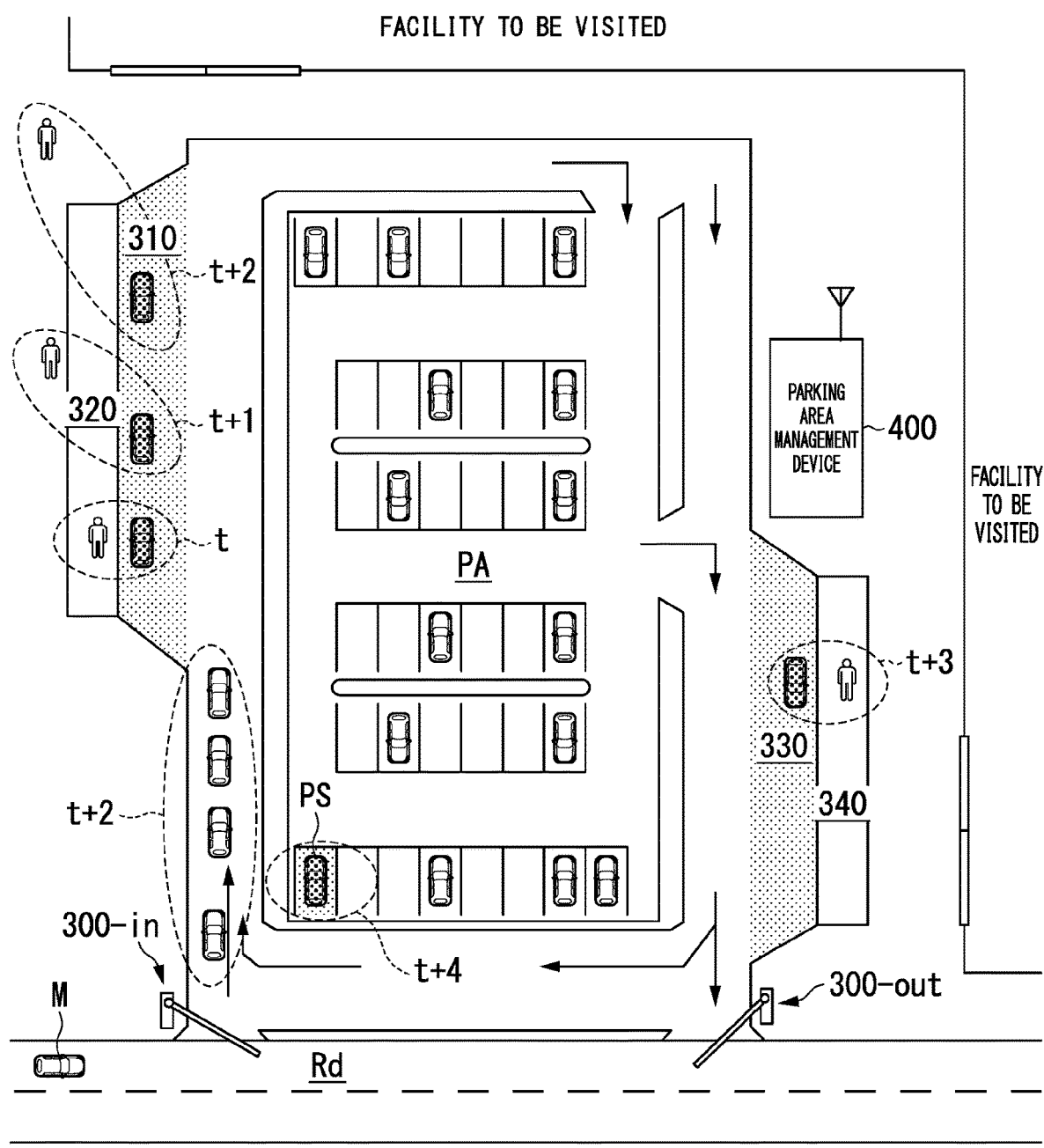
FIG. 13 is a diagram (part 1) showing another example of a scene in which a getting-into area becomes a meeting point.

FIG. 13 is a diagram (part 1) showing another example of a scene in which the getting-into area 340 becomes a meeting point. Description similar to that of FIG. 10 will be omitted. For example, it is determined that the specific physical object is present at time t+1 and it is assumed that information indicating that the specific physical object is present in the interior of the vehicle has been transmitted to the terminal device 500 at time t+2. At this time, a user holding the terminal device 500 is present near the getting-out area 320. When the getting-out area 320 is congested at a prescribed degree or more, a getting-into area that is not congested at a prescribed degree or more is determined to be a meeting point. Then, the automated driving control device 100 causes the host vehicle M to move to the getting-into area 340.

At time t+3, the host vehicle M and the user meet in the getting-into area 340 and the user takes a specific physical object out of the interior of the vehicle and transmits a parking request to the automated driving control device 100. When the parking request is acquired, the automated driving control device 100 enters the entrance of the parking area after passing through the getting-out area 320 again and causes the host vehicle M to be parked in the parking space PS at time t+4.

In this manner, when a specific physical object is present, the automated driving control device 100 can minimize a degree of congestion of a facility by determining the meeting point in consideration of the degree of congestion of the getting-out area 320 (or the getting-into area 340).

Figure 14:
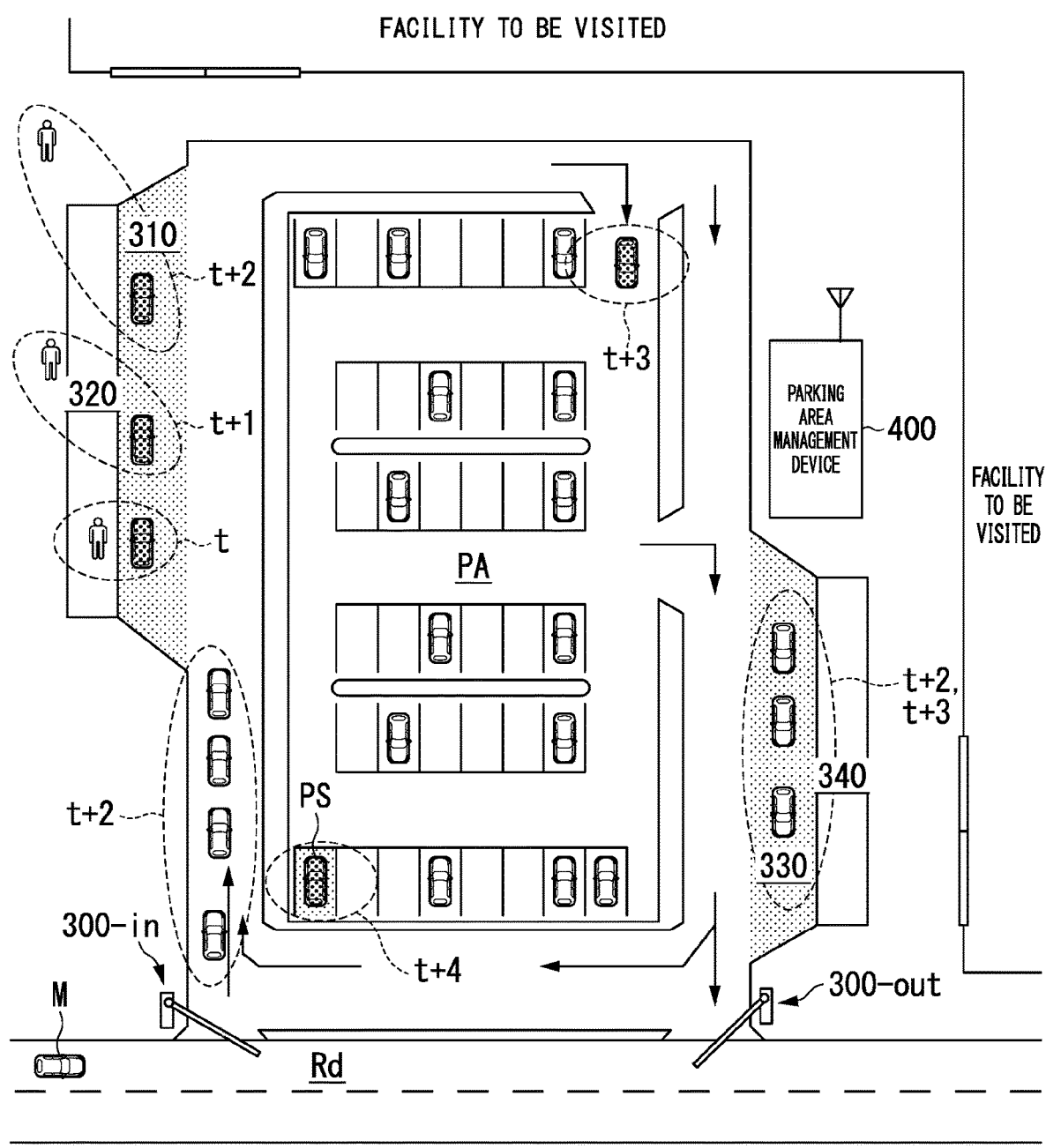
FIG. 14 is a diagram (part 2) showing another example of a scene in which a getting-into area becomes a meeting point.

FIG. 14 is a diagram (part 2) showing another example of a scene in which the getting-into area 340 serves as a meeting point. Description similar to that of FIG. 10 will be omitted. For example, it is determined that the specific physical object is present at time t+1 and it is assumed that information indicating that the specific physical object is present in the interior of the vehicle has been transmitted to the terminal device 500 at time t+2. A user holding the terminal device 500 is present in the vicinity of the getting-out area 320. At this time, when the getting-out area 320 and the getting-into area 340 are congested at a prescribed degree or more, the automated driving control device 100 causes the host vehicle M to move to the parking area.

In this manner, the automated driving control device 100 causes the host vehicle M to enter the entrance of the parking area at time t+3 and causes the host vehicle M to be parked in the parking space PS at time t+4.

In this manner, if the facility is congested even when a specific physical object is present, the automated driving control device 100 can minimize the degree of congestion of the facility by causing the host vehicle M to move to the parking area.

The degree of congestion is derived, for example, by the parking area management device 400 or the automated driving control device 100 (for example, the information processor 110). In the following description, an example in which the parking area management device 400 determines a meeting point will be described. When the degree of congestion is derived, the automated driving control device 100 performs a process equivalent to a process to be performed by the parking area management device 400 to be described below.

Figure 15:
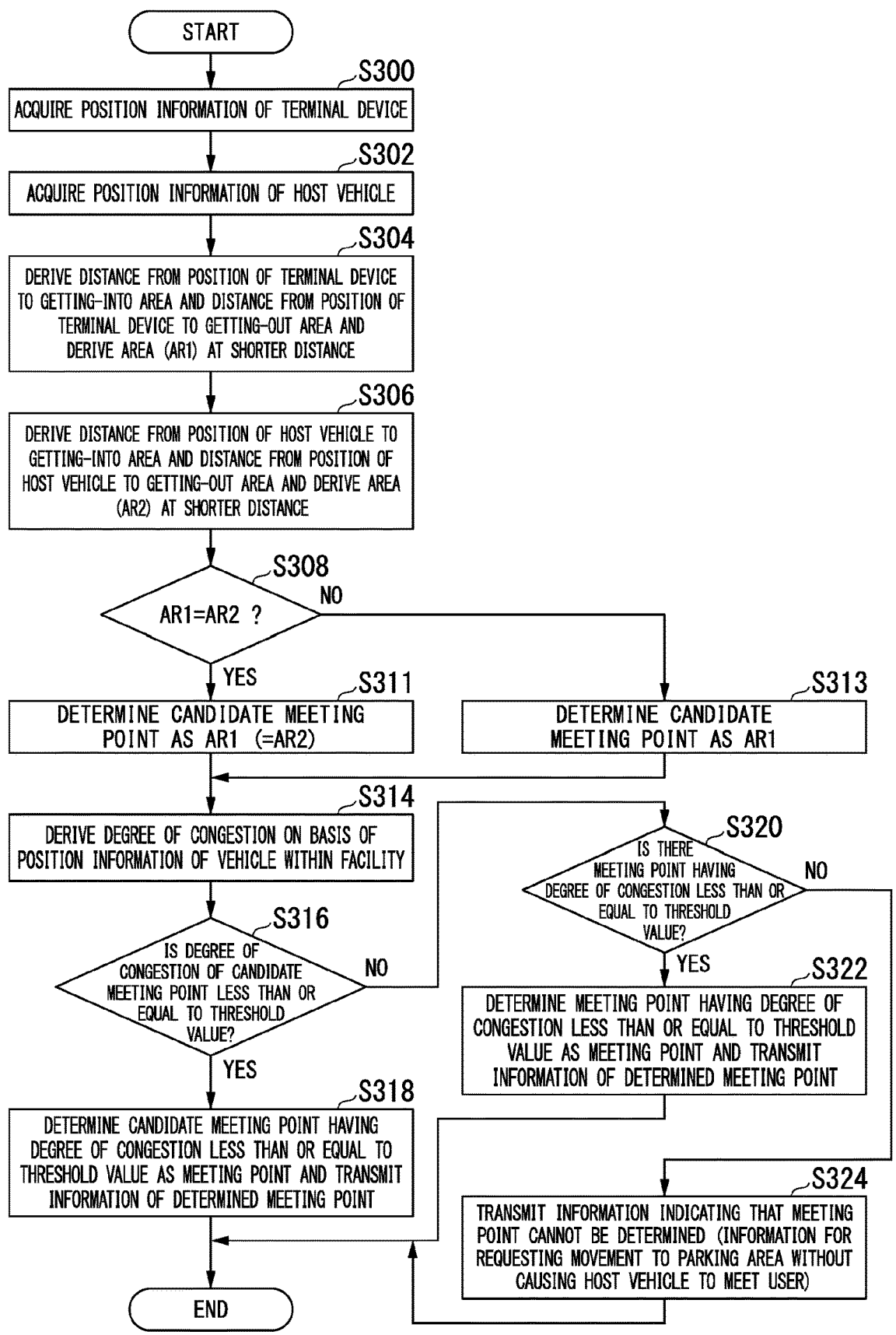
FIG. 15 is a flowchart showing an example of a flow of a process to be executed by the automated driving control device.

FIG. 15 is a flowchart showing an example of a flow of a process to be executed by the automated driving control device 100. Because the processing of steps S300 to S308 of FIG. 15 is similar to the processing of steps S300 to S308 of FIG. 12, description thereof will be omitted.

When the area AR1 and the area AR2 match, the determiner 422 determines the matching area as a candidate meeting point (step S311). When the area AR1 and the area AR2 do not match, the determiner 422 determines the area AR1 close to the user of the terminal device 500 as a candidate meeting point (step S313).

Next, the deriver 424 derives the degree of congestion on the basis of position information of the vehicle in a facility (step S314). The facility is a facility related to a parking area including the parking area PA, the getting-out area 320, the getting-into area 340, and a route used when movement between these areas is performed. The degree of congestion is, for example, the number of vehicles per unit area (for example, a density). For example, the greater the density, the greater the degree of congestion.

Next, the determiner 422 determines whether or not the degree of congestion at the candidate meeting point is less than or equal to a threshold value (step S316). When the congestion degree of the candidate meeting point is less than or equal to the threshold value, the determiner 422 determines the candidate meeting point determined to have the degree of congestion less than or equal to the threshold value in the processing of step S316 as the meeting point, and information of the determined meeting point is transmitted to the host vehicle M (or the terminal device 500) (step S318).

When the degree of congestion at the candidate meeting point is not less than or equal to the threshold value (when the degree of congestion at the candidate meeting point exceeds the threshold value), the determiner 422 determines whether or not there is a meeting point having a degree of congestion less than or equal to the threshold value (for example, an accessible area having a degree of congestion less than or equal to the threshold value) (step S320). When there is a meeting point having a degree of congestion less than or equal to the threshold value, the determiner 422 determines the meeting point having the degree of congestion less than or equal to the threshold value as the meeting point and transmits information of the determined meeting point to the host vehicle M (or the terminal device 500) (step S322).

When there are a plurality of meeting points in step S322, a meeting point to which the user can easily move (a meeting point at a short distance from the user's position) or a meeting point with the lowest degree of congestion may be determined to be the meeting point. When there are a plurality of meeting points in step S322, the meeting point may be determined on the basis of a result of a statistical process on the ease of movement of the user and the degree of congestion.

When there is no meeting point having a degree of congestion less than or equal to the threshold value in step S320, the determiner 422 transmits information indicating that the meeting point cannot be determined to the host vehicle M (or the terminal device 500) (step S324). That is, information for requesting movement to the parking area without causing the host vehicle M to meet the user is transmitted to the host vehicle M. Thereby, the process of one routine of the present flowchart is completed.

If the facility is congested also when there is a specific physical object according to the above-described process, the automated driving control device 100 can minimize the degree of congestion of the facility by causing the host vehicle M to move to the parking area.

[Movement Process (Part 4)]

The automated driving control device 100 changes the speed while moving (or at the time of movement) when the vehicle is moved to the accessible area according to automated driving on the basis of position information of the user and position information related to the host vehicle M.

For example, the information processor 110 of the automated driving control device 100 changes the speed while moving (at the time of movement) on the basis of a specific indication transmitted by the parking area management device 400 and on the basis of a clock time at which the user arrives at the meeting point or a position related to the meeting point of the user. The specific indication is an indication such as a moving speed, an arrival time at a meeting point, or a clock time of departure from a current stop point.

For example, the deriver 424 derives the specific indication so that the host vehicle M arrives at the meeting point at a timing matching a timing at which the user arrives at the meeting point on the basis of position information (or a movement trajectory or a moving speed) of the user and position information (or a movement trajectory or a moving speed) related to the host vehicle M. For example, when the degree of congestion at the meeting point is greater than the degree of congestion at the current stop point, the deriver 424 generates an instruction for stopping the host vehicle M at the current stop point for a prescribed period of time or changing the speed in a route from the current stop point to the meeting point on the basis of the specific indication.

The deriver 424 generates an instruction for moving the host vehicle M to the meeting point by diverting the host vehicle M or generates an instruction for moving the host vehicle M to the meeting point by diverting the host vehicle M toward the meeting point when the meeting point is congested at a prescribed degree or more. That is, a "route along which the vehicle moves according to automated driving is changed".

Contrast with Comparative Example

Even if the user desires to take a specific physical object out of the interior of the vehicle after the user transmits a parking request, the vehicle control system of the comparative example causes the host vehicle to move to the parking area or causes the host vehicle to be parked in the parking space in accordance with the parking request. In this case, the user may need to take the host vehicle out of the parking area again, time may be required until the user meets the host vehicle, or a movement cost of the host vehicle may be required. Due to the movement of the host vehicle, a cost related to an operation in the operation of the parking area may increase or the congestion of the parking area may be affected.

On the other hand, in the automated driving control device 100 of the present embodiment, when the specific physical object is present in the interior of the vehicle after the user transmits a parking request, the movement of the host vehicle M to the parking area or the parking of the host vehicle M to the parking space is minimized and the host vehicle M moves to the accessible area different from the parking area. As a result, the user can meet the host vehicle M without incurring costs. The cost is, for example, a cost related to the movement of the host vehicle M or the user or a cost in the operation of the parking area. The user can easily meet the host vehicle M while preventing the congestion of the parking area from being affected.

According to the first embodiment described above, when the automated driving control device 100 has acquired a parking request and has recognized a specific physical object placed in the interior of the vehicle, it is possible to improve the convenience for the user by allowing the user to move the host vehicle M to the accessible area according to automated driving or causing the vehicle to stay in the accessible area.

Second Embodiment

Hereinafter, a second embodiment will be described. In the first embodiment, the automated driving control device 100 determines the presence or absence of a specific physical object by comparing an image obtained by previously imaging a state of the interior of the vehicle with an image obtained by imaging a state of the interior of the vehicle when a user gets out of the vehicle. In the second embodiment, an automated driving control device 100 treats a physical object registered on the basis of a user's operation as a specific physical object and determines that the specific physical object is present within the interior of a vehicle when the registered physical object is present within the interior of the vehicle when the user gets out of the vehicle. Hereinafter, differences from the first embodiment will be mainly described.

Figure 16:
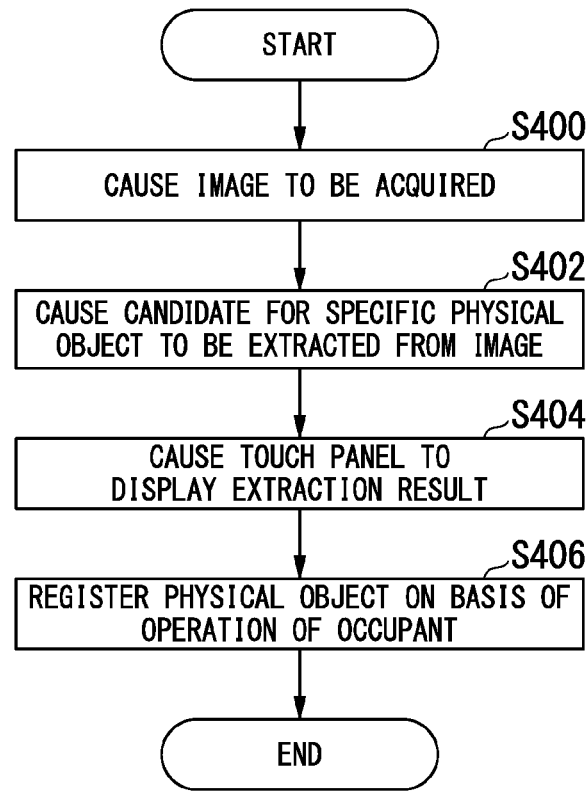
FIG. 16 is a flowchart showing an example of a flow of a process in which a physical object is registered as a specific physical object to be executed by the automated driving control device.

FIG. 16 is a flowchart showing an example of a flow of a process in which a physical object is registered as a specific physical object to be executed by the automated driving control device 100. First, an information processor 110 causes a vehicle interior camera 17 to acquire an image after the user gets into the host vehicle M (step S400). Next, the information processor 110 causes a vehicle interior recognizer 18 to analyze the image acquired in step S400 and extract candidates for the specific physical object (step S402). The candidates for the specific physical object are preset physical objects. For example, the vehicle interior recognizer 18 extracts the candidates for the specific physical object on the basis of feature quantities of the physical object pre-stored in a storage device provided in a vehicle system 2. The feature quantities are, for example, an index indicating luminance, an index indicating a degree of change in luminance with respect to a reference value, and the like. For example, the vehicle interior recognizer 18 extracts a rectangular area corresponding to a candidate for the specific physical object in the image (see FIG. 17).

Figure 17:
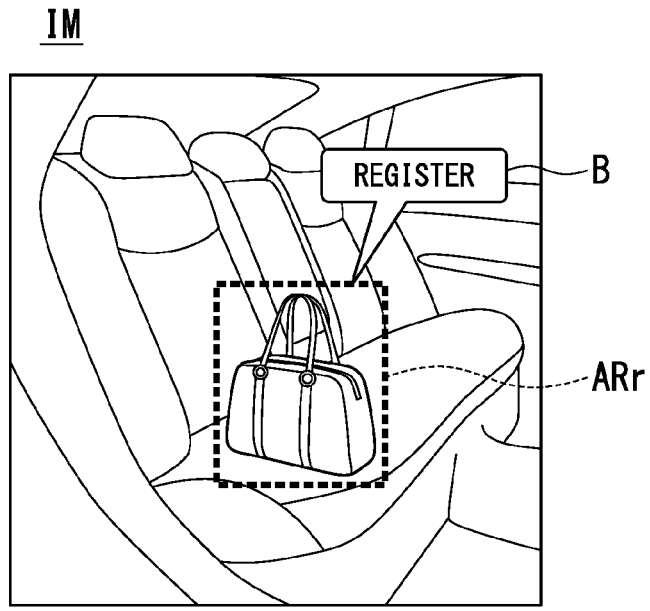
FIG. 17 is a diagram showing an example of an image IM showing an extraction result displayed on a touch panel.

Next, the information processor 110 causes the touch panel of the HMI 30 to display an extraction result of step S404 (step S404). FIG. 17 is a diagram showing an example of an image IM showing an extraction result displayed on the touch panel. The image IM in which the rectangular area ARr is associated with a physical object in the image is displayed on the touch panel. A registration button B for registering a physical object associated with the rectangular area ARr as a specific physical object is set in the image IM.

Figures 18, 19:
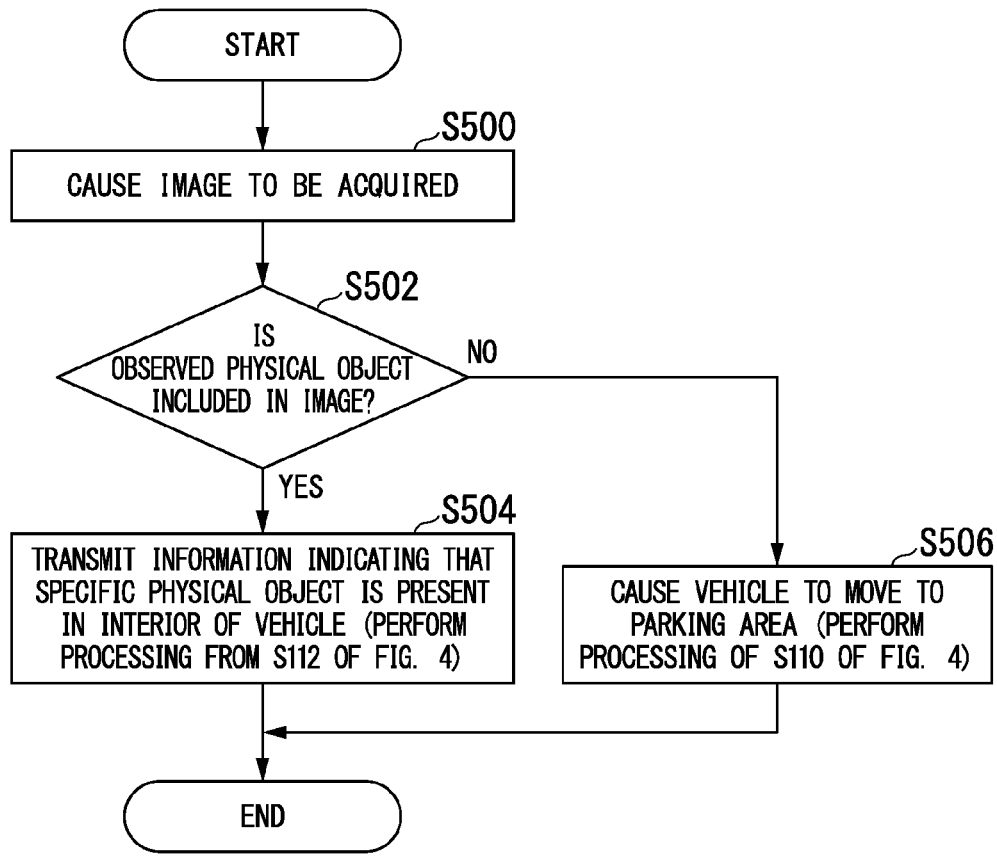
FIG. 18 is a diagram showing an example of an observed physical object table showing a list of registered observed physical objects.
FIG. 19 is a flowchart showing an example of a flow of a process of determining whether or not there is a specific physical object in the interior of a vehicle when a user gets out of the vehicle to be executed by the automated driving control device.

When the user operates the registration button B, the automated driving control device 100 registers a physical object associated with the rectangular area ARr as an observed physical object in a storage device (not shown) (step S406). FIG. 18 is a diagram showing an example of an observed physical object table 180 showing a list of registered observed physical objects. In the observed physical object table 180, the identification information (ID) of the observed physical object, an image corresponding to the rectangular area including the observed physical object, and a distribution of feature quantities extracted from the image corresponding to the rectangular area are associated with each other. The observed physical object is an example of a "physical object registered in association with information (for example, a feature quantity) based on an image captured in advance".

As described in the flowchart of FIG. 19 to be described below, the automated driving control device 100 refers to the above-mentioned observed physical object table 180, recognizes an observed physical object as a specific physical object when the observed physical object is present in the interior of the vehicle when the user gets out of the vehicle, and determines that the specific physical object is present in the interior of the vehicle.

FIG. 19 is a flowchart showing an example of a flow of a process of determining whether or not there is a specific physical object in the interior of the vehicle when the user gets out of the vehicle to be executed by the automated driving control device 100. The present process is a process to be executed after the user in the host vehicle M gets out of the host vehicle M.

First, the information processor 110 causes the vehicle interior camera 17 to acquire an image (step S500). Next, the information processor 110 determines whether or not an observed physical object is included in the image acquired in step S500 (step S502). For example, the information processor 110 causes the vehicle interior recognizer 18 to extract feature quantities from the image acquired in step S500 and compare a distribution of the extracted feature quantities with a distribution of feature quantities of the observed physical object registered in the observed physical object table 180. When it is determined that the distribution of the feature quantities of the observed physical object registered in the observed physical object table 180 by the vehicle interior recognizer 18 matches the distribution of the feature quantities in the image, the information processor 110 determines that the observed physical object is included in the image.

When it is determined that the observed physical object is included in the image, the information provider 170 transmits information indicating that the specific physical object is present in the interior of the vehicle to the terminal device 500 (step S504). That is, when it is determined that the observed physical object is included in the image, the processing after step S112 of FIG. 4 is performed. In this manner, when the information provider 170 has recognized a physical object registered in advance, the information provider 170 notifies the terminal device 500 of the user of information indicating that the specific physical object is left behind in the interior of the vehicle.

When there is no specific physical object, the action plan generator 140 causes the host vehicle M to move to the parking area (step S506). That is, when there is no specific physical object, the processing of step S110 in FIG. 4 is performed. Thereby, the process of one routine of the present process is completed.

The specific physical object may be a physical object different from a physical object registered in association with information based on an image captured in advance. In this case, when a physical object that has not been registered in advance has been recognized on the basis of the image, the information provider 170 may notify the terminal device 500 of the user of information indicating that the specific physical object is left behind in the interior of the vehicle.

Although an example in which notification is performed when a physical object registered in advance by the user (or a physical object that has not been registered) is present in the interior of the vehicle has been described above, the host vehicle M may stay in a place when a device for performing an operation of starting the valet parking such as a smartphone is present in the interior of the vehicle regardless of the presence or absence of registration or the host vehicle M may move to an accessible area capable of being accessed by the user according to automated driving.

According to the second embodiment described above, because the automated driving control device 100 determines whether or not there is a specific physical object in the interior of the vehicle on the basis of information of the registered observed physical object, it is possible to detect that the specific physical object is left behind in the interior of the vehicle more accurately. As a result, the convenience for the user can be improved.

Third Embodiment

Hereinafter, a third embodiment will be described. In the third embodiment, in an automated driving control device 100, an information provider 170 acquires the next scheduled clock time at which a user for which a parking request has been output will get into a vehicle. When the parking request is acquired, a physical object placed in the interior of the vehicle is recognized, and the acquired scheduled clock time at which the user will get into the vehicle (or stay time) is within a period of prescribed time from a current clock time, the automated driving control device 100 does not cause the vehicle to move to an accessible area capable of being accessed by the user according to automated driving. Hereinafter, differences from the first embodiment will be mainly described.

Figures 20, 21:
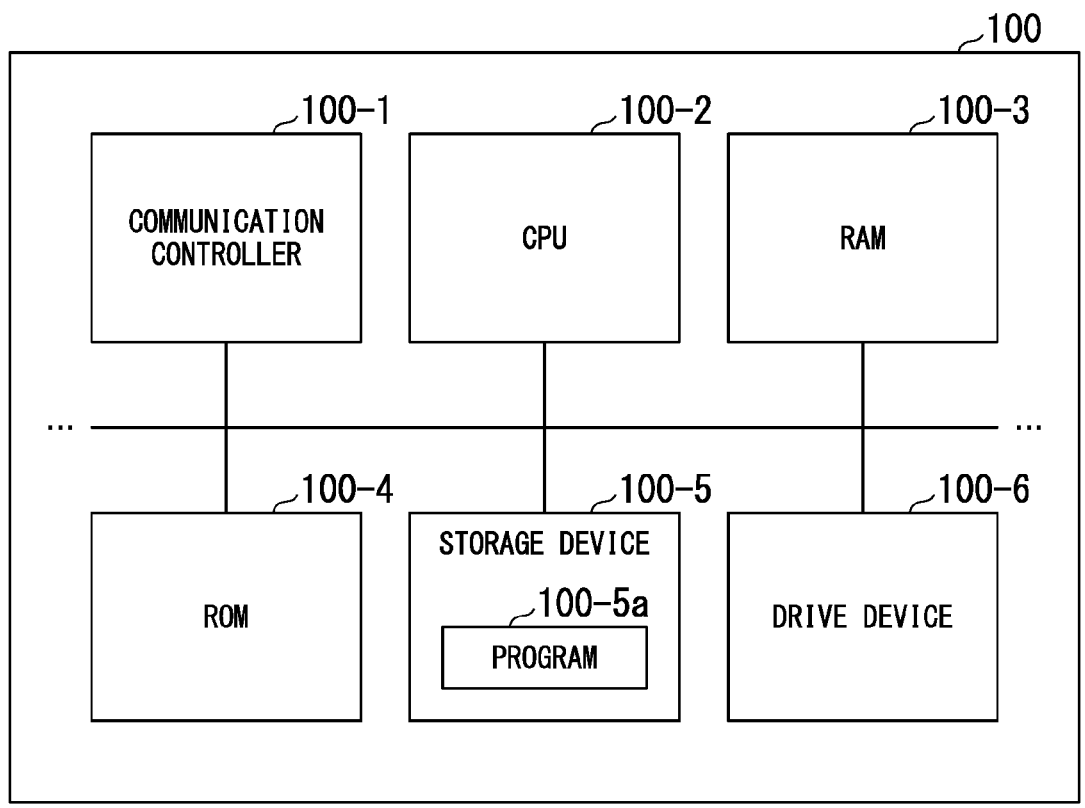
FIG. 20 is a diagram showing an example of details of schedule information.
FIG. 21 is a diagram showing an example of a hardware configuration of the automated driving control device of the embodiment.

For example, the information processor 110 determines whether or not a host vehicle M has been parked in a parking area for prescribed time or more with reference to schedule information 182. FIG. 20 is a diagram showing an example of details of the schedule information 182. For example, the schedule information 182 is information described in a storage device of a vehicle system 2. The schedule information 182 is, for example, information transmitted by a terminal device 500 of the user or information registered by the user operating an HMI 30 of the host vehicle M. For example, the schedule information 182 is information in which a facility to be visited, the time of arrival or staying at the facility, and details of a schedule are associated with each other.

For example, the information processor 110 identifies a facility where the host vehicle M is present on the basis of position information of the host vehicle M and map information. The information processor 110 estimates the stay time in the facility where the host vehicle M is present with reference to the schedule information 182. When it is estimated that the stay time is within a prescribed period of time, the information processor 110 does not cause the vehicle to move to the accessible area capable of being accessed by the user according to automated driving even if a specific physical object is present in the interior of the vehicle after an occupant gets out of the vehicle.

When the stay time cannot be estimated, the information processor 110 may not cause the vehicle to move to the accessible area capable of being accessed by the user according to automated driving when a facility where the host vehicle M is present is a specific facility with reference to map information. The specific facility is a facility in which the stay time derived on the basis of an action history of the host vehicle M acquired by the automated driving control device 100 so far is within a prescribed period of time. The schedule information 182 may be information including the time when the host vehicle M moves to the getting-into area of the facility. In this case, if the time when the host vehicle M moves to the getting-into area of the facility is within the prescribed period of time from a current clock time, the information processor 110 does not cause the vehicle to move to the accessible area capable of being accessed by the user according to automated driving even if the specific object is present in the interior of the vehicle.

According to the third embodiment described above, it is possible to minimize congestion of a facility related to a parking area because the user does not cause the vehicle to move to the accessible area according to automated driving when it is estimated that a specific physical object left behind in the interior of the vehicle does not significantly affect the user. Thus, the user is prevented from receiving an unnecessary notification.

In the above-described embodiment, the self-propelled parking event is assumed to be started on the basis of a signal output from the terminal device 500. However, alternatively (or additionally), the self-propelled parking event may be started on the basis of a prescribed gesture of a user getting out of the host vehicle M. In this case, when a recognizer 130 has recognized the prescribed gesture on the basis of an image captured by a camera 10, an action plan generator 140 causes a traveling/parking event to be started.

Some processes among the processes of the flowcharts described above may be omitted and the order of the processes may be changed. The processes of the embodiments may be performed in combination.

[Hardware Configuration]

FIG. 21 is a diagram showing an example of a hardware configuration of the automated driving control device 100 of the embodiment. As shown, the automated driving control device 100 has a configuration in which a communication controller 100-1, a CPU 100-2, a random-access memory (RAM) 100-3 used as a working memory, a read-only memory (ROM) 100-4 storing a boot program and the like, a storage device 100-5 such as a flash memory or a hard disk drive (HDD), a drive device 100-6, and the like are mutually connected by an internal bus or a dedicated communication line. The communication controller 100-1 communicates with components other than the automated driving control device 100. A program 100-5a executed by the CPU 100-2 is stored in the storage device 100-5. This program is loaded to the RAM 100-3 by a direct memory access (DMA) controller (not shown) or the like and executed by the CPU 100-2. Thereby, some or all of the information processor 110, the first controller 120, the second controller 160, and the information provider 170 are implemented.

The embodiment described above can be implemented as follows.

A vehicle control device, including:
a storage device configured to store a program; and
a hardware processor,
wherein the hardware processor executes the program stored in the storage device to:
recognize a surrounding situation of a vehicle;
control steering, acceleration, and deceleration of the vehicle without depending upon an operation of an occupant on the basis of the recognized surrounding situation;
recognize a physical object placed in an interior of the vehicle;
acquire a movement instruction for moving the vehicle to a parking area according to control of a driving controller, the movement instruction being output on the basis of an action of a user who has not got into the vehicle; and
move the vehicle to an accessible area capable of being accessed by the user or make the vehicle stay in the accessible area when the movement instruction has been acquired and the physical object placed in the interior of the vehicle has been recognized.

Although modes for carrying out the present invention have been described using embodiments, the present invention is not limited to the embodiments, and various modifications and substitutions can also be made without departing from the scope and spirit of the present invention.

What is claimed is:

1. A vehicle control device, comprising:
a storage device configured to store a program; and
a hardware processor,
wherein the hardware processor executes the program stored in the storage device to:
recognize a surrounding situation of a vehicle;
control steering, acceleration, and deceleration of the vehicle without depending upon an operation of an occupant on the basis of the surrounding situation recognized;
recognize a physical object placed in an interior of the vehicle; and
acquire a movement instruction for moving the vehicle to a parking area according to control of the driving controller, the movement instruction being output on the basis of an action of an outside user who has not gotten into the vehicle,
wherein the control causes the vehicle to move to an accessible area capable of being accessed by the outside user or causes the vehicle to stay in the accessible area when the movement instruction is acquired and the physical object placed in the interior of the vehicle is recognized.

2. The vehicle control device according to claim 1, wherein the accessible area is an area different from the parking area.

3. The vehicle control device according to claim 1, wherein the accessible area is a getting-out area where an inside user in the vehicle gets out of the vehicle when the vehicle moves to the parking area according to control or a getting-into area where the outside user gets into the vehicle when the vehicle parked in the parking area has left according to control.

4. The vehicle control device according to claim 1, wherein the hardware processor further executes the program stored in the storage device to: determine whether or not the physical object is placed in the interior of the vehicle when an inside user in the vehicle has gotten out of the vehicle.

5. The vehicle control device according to claim 1, wherein the hardware processor further executes the program stored in the storage device to: determine driving controller causes the vehicle to move to the parking area without causing the vehicle to move to the accessible area when the movement instruction is acquired and the physical object placed in the interior of the vehicle is not recognized.

6. The vehicle control device according to claim 1, wherein the hardware processor further executes the program stored in the storage device to: acquire position information of the outside user,
wherein the control changes a route for moving the vehicle to the accessible area according to control or a speed while moving on the basis of the position information of the outside user and position information related to the vehicle.

7. The vehicle control device according to claim 6, wherein the driving controller hardware processor further executes the program stored in the storage device to: cause the vehicle to move to the accessible area near a position of the outside user among a plurality of accessible areas on the basis of the position information of the outside user and the position information related to the vehicle.

8. The vehicle control device according to claim 1, wherein the hardware processor further executes the program stored in the storage device to: provide a terminal device of the user with information indicating that the physical object is left behind in the interior of the vehicle when the movement instruction is acquired and the physical object placed in the interior of the vehicle is recognized.

9. The vehicle control device according to claim 1, wherein the hardware processor further executes the program stored in the storage device to: recognize the physical object on the basis of an image captured by an imager which images a state of the interior of the vehicle.

10. The vehicle control device according to claim 1,
wherein the physical object is a physical object previously registered in association with information based on a captured image, and
wherein the hardware processor further executes the program stored in the storage device to: notify a terminal device of the user of information indicating that the physical object is left behind in the interior of the vehicle when the previously registered physical object on the basis of the image is recognized.

11. The vehicle control device according to claim 1,
wherein the physical object is a physical object different from a physical object previously registered in association with information based on a captured image, and
wherein the hardware processor further executes the program stored in the storage device to: notify a terminal device of the outside user of information indicating that the physical object is left behind in the interior of the vehicle when the physical object that has not been previously registered on the basis of the image is recognized.

12. The vehicle control device according to claim 1, wherein the hardware processor further executes the program stored in the storage device to: acquire a degree of congestion of the accessible area capable of being accessed by the outside user,
wherein the control does not cause the vehicle to move to the accessible area having the degree of congestion acquired greater than or equal to a prescribed degree when the acquirer has acquired the movement instruction is acquired and the physical object placed in the interior of the vehicle is recognized.

13. The vehicle control device according to claim 1, wherein the driving controller hardware processor further executes the program stored in the storage device to: cause the vehicle to move to the parking area when a prescribed period of time has elapsed from the time of movement of the vehicle to the accessible area according to control.

14. The vehicle control device according to claim 1, wherein the hardware processor further executes the program stored in the storage device to: acquire a next scheduled clock time at which the outside user for which the movement instruction has been output will get into the vehicle,
wherein the control does not cause the vehicle to move to the accessible area capable of being accessed by the outside user when the movement instruction is acquired, the physical object placed in the interior of the vehicle is recognized, and the scheduled clock time at which the outside user will get into the vehicle acquired is within a prescribed period of time from a current clock time.

15. A vehicle control method, comprising:
recognizing, by a computer, a surrounding situation of a vehicle;
controlling, by the computer, steering, acceleration, and deceleration of the vehicle without depending upon an operation of an occupant on the basis of the recognized surrounding situation;
recognizing, by the computer, a physical object placed in an interior of the vehicle;
acquiring, by the computer, a movement instruction for moving the vehicle to a parking area according to control of the steering, the acceleration, and the deceleration of the vehicle, the movement instruction being output on the basis of an action of an outside user who has not got into the vehicle; and
causing, by the computer, the vehicle to move to an accessible area capable of being accessed by the outside user or causing the vehicle to stay in the accessible area when the movement instruction has been acquired and the physical object placed in the interior of the vehicle has been recognized.

16. A non-transitory computer-readable storage medium that stores a computer program to be executed by a computer to perform at least:
recognize a surrounding situation of a vehicle;
control steering, acceleration, and deceleration of the vehicle without depending upon an operation of an occupant on the basis of the recognized surrounding situation;
recognize a physical object placed in an interior of the vehicle;
acquire a movement instruction for moving the vehicle to a parking area according to control of the steering, the acceleration, and the deceleration of the vehicle, the movement instruction being output on the basis of an action of an outside user who has not got into the vehicle; and
move the vehicle to an accessible area capable of being accessed by the outside user or make the vehicle stay in the accessible area when the movement instruction has been acquired and the physical object placed in the interior of the vehicle has been recognized.

* * * * *